US007354988B2

(12) United States Patent
Charati et al.

(10) Patent No.: US 7,354,988 B2
(45) Date of Patent: Apr. 8, 2008

(54) ELECTRICALLY CONDUCTIVE COMPOSITIONS AND METHOD OF MANUFACTURE THEREOF

(75) Inventors: Sanjay Gurbasappa Charati, Bangalore (IN); Dibakar Dhara, Bangalore (IN); Soumyadeb Ghosh, Bangalore (IN); Nitin Mutha, Maharashtra (IN); Srinivasan Rajagopalan, Bangalore (IN); Abbas Alli Shaikh, Bangalore (IN); Mark D. Elkovitch, Selkirk, NY (US)

(73) Assignee: General Electric Company, Schenectady, NY (US)

( * ) Notice: Subject to any disclaimer, the term of this patent is extended or adjusted under 35 U.S.C. 154(b) by 145 days.

(21) Appl. No.: 11/270,953

(22) Filed: Nov. 11, 2005

(65) Prior Publication Data
US 2006/0069199 A1    Mar. 30, 2006

Related U.S. Application Data

(63) Continuation-in-part of application No. 10/803,694, filed on Mar. 18, 2004, now Pat. No. 7,026,432.

(60) Provisional application No. 60/494,678, filed on Aug. 12, 2003.

(51) Int. Cl.
C08G 63/00 (2006.01)
(52) U.S. Cl. ............... 528/271; 423/447.1; 423/447.2; 428/36.9; 428/36.91; 428/67; 428/408; 524/496; 528/272
(58) Field of Classification Search ........... 423/447.1, 423/447.2; 428/36.9, 67, 36.91, 408; 524/496; 528/271, 272
See application file for complete search history.

(56) References Cited

U.S. PATENT DOCUMENTS

| 2,465,319 | A | 3/1949 | Whinfield et al. |
|---|---|---|---|
| 3,047,539 | A | 7/1962 | Pengilly |
| 3,324,068 | A | 6/1967 | Michaels |
| 3,847,867 | A | 11/1974 | Heath et al. |
| 3,850,885 | A | 11/1974 | Takekoshi et al. |
| 3,852,113 | A | 12/1974 | Yokota et al. |
| 3,852,242 | A | 12/1974 | White |
| 3,855,178 | A | 12/1974 | White et al. |
| 3,972,902 | A | 8/1976 | Heath et al. |
| 3,983,093 | A | 9/1976 | Williams, III et al. |
| 4,005,053 | A | 1/1977 | Briggs et al. |
| 4,115,475 | A | 9/1978 | Foy et al. |
| 4,141,927 | A | 2/1979 | White et al. |
| 4,195,015 | A | 3/1980 | Deleens et al. |
| 4,230,838 | A | 10/1980 | Foy et al. |
| 4,331,786 | A | 5/1982 | Foy et al. |
| 4,332,920 | A | 6/1982 | Foy et al. |
| 4,443,591 | A | 4/1984 | Schmidt et al. |
| 4,455,410 | A | 6/1984 | Giles, Jr. et al. |
| 4,492,382 | A | 1/1985 | Hounsel |
| 4,536,531 | A | 8/1985 | Ogawa et al. |
| 4,559,164 | A | 12/1985 | Kostelnik et al. |
| 4,565,684 | A | 1/1986 | Tibbetts et al. |
| 4,572,813 | A | 2/1986 | Arakawa |
| 4,637,945 | A | 1/1987 | Masui et al. |
| 4,663,230 | A | 5/1987 | Tennent |
| 4,680,329 | A | 7/1987 | Brown et al. |
| 4,749,451 | A | 6/1988 | Naarmann |
| 4,816,289 | A | 3/1989 | Komatsu et al. |
| 4,839,441 | A | 6/1989 | Cuzin et al. |
| 4,864,014 | A | 9/1989 | Cuzin et al. |
| 4,871,613 | A | 10/1989 | Akao |
| 4,876,033 | A | 10/1989 | Dziurla et al. |
| 4,876,078 | A | 10/1989 | Arakawa et al. |
| 4,908,418 | A | 3/1990 | Holub |
| 4,908,419 | A | 3/1990 | Holub et al. |
| 4,966,729 | A | 10/1990 | Carmona et al. |
| 4,968,418 | A | 11/1990 | Rohr |
| 5,004,561 | A | 4/1991 | Nomura et al. |
| 5,024,818 | A | 6/1991 | Tibbetts et al. |
| 5,036,580 | A | 8/1991 | Fox et al. |
| 5,071,329 | A | 12/1991 | Sano et al. |
| 5,093,435 | A | 3/1992 | Harris et al. |
| 5,159,053 | A | 10/1992 | Kolycheck et al. |
| 5,165,909 | A | 11/1992 | Tennent et al. |
| 5,171,761 | A | 12/1992 | Penco et al. |
| 5,227,038 | A | 7/1993 | Smalley et al. |
| 5,256,335 | A | 10/1993 | Byrd et al. |
| 5,284,903 | A | 2/1994 | Minnick |
| 5,300,203 | A | 4/1994 | Smalley |
| 5,300,553 | A | 4/1994 | Yamanashi et al. |
| 5,302,274 | A | 4/1994 | Tomantschger et al. |
| 5,312,866 | A | 5/1994 | Tsutsumi et al. |
| 5,354,607 | A | 10/1994 | Swift et al. |
| 5,385,970 | A | 1/1995 | Gallucci et al. |
| 5,439,987 | A | 8/1995 | Scott et al. |
| 5,445,327 | A | 8/1995 | Creehan |
| 5,484,837 | A | 1/1996 | Kung et al. |
| 5,514,748 | A | 5/1996 | Isutsumi et al. |

(Continued)

FOREIGN PATENT DOCUMENTS

EP    0 198 558 B1    4/1993

(Continued)

OTHER PUBLICATIONS

International Search Report; International App. No. PCT/US2006/004468; Applicant's No. 08CN8788 (GP2-0388) Date of Mailing Nov. 20, 2006.

(Continued)

Primary Examiner—Terressa Boykin
(74) Attorney, Agent, or Firm—Cantor Colburn LLP

(57) ABSTRACT

A method for manufacturing a conductive composition comprises blending a polymer precursor with a single wall carbon nanotube composition; and polymerizing the polymer precursor to form an organic polymer. The method may be advantageously used for manufacturing automotive components, computer components, and other components where electrical conductivity properties are desirable.

29 Claims, No Drawings

U.S. PATENT DOCUMENTS

| | | | |
|---|---|---|---|
| 5,516,837 A | 5/1996 | Tsutsumi et al. |
| 5,543,474 A | 8/1996 | Kawaki et al. |
| 5,556,517 A | 9/1996 | Smalley |
| 5,566,892 A | 10/1996 | Creehan |
| 5,571,875 A | 11/1996 | Tsutsumi et al. |
| 5,589,152 A | 12/1996 | Tennent et al. |
| 5,591,312 A | 1/1997 | Smalley |
| 5,591,382 A | 1/1997 | Nahass et al. |
| 5,591,832 A | 1/1997 | Koshijima et al. |
| 5,604,284 A | 2/1997 | Ueda et al. |
| 5,641,455 A | 6/1997 | Rosenlund et al. |
| 5,643,502 A | 7/1997 | Nahass et al. |
| 5,643,990 A | 7/1997 | Uehara et al. |
| 5,651,922 A | 7/1997 | Nahass et al. |
| 5,652,326 A | 7/1997 | Ueda et al. |
| 5,654,357 A | 8/1997 | Menashi et al. |
| 5,718,995 A | 2/1998 | Eichorst et al. |
| 5,744,235 A | 4/1998 | Creehan |
| 5,830,326 A | 11/1998 | Iijima |
| 5,840,807 A | 11/1998 | Frey et al. |
| 5,863,466 A | 1/1999 | Mor |
| 5,866,647 A | 2/1999 | Massey et al. |
| 5,872,177 A | 2/1999 | Whitehouse |
| 5,876,647 A | 3/1999 | Makise et al. |
| 5,886,098 A | 3/1999 | Ueda et al. |
| 5,919,429 A | 7/1999 | Tanaka et al. |
| 6,063,874 A | 5/2000 | Jin et al. |
| 6,103,413 A | 8/2000 | Hinton et al. |
| 6,107,415 A | 8/2000 | Silvi et al. |
| 6,148,280 A | 11/2000 | Kramer |
| 6,331,265 B1 | 12/2001 | Dupire et al. |
| 6,344,513 B1 | 2/2002 | Numata |
| 6,346,189 B1 | 2/2002 | Dai et al. |
| 6,365,069 B2 | 4/2002 | Butler et al. |
| 6,368,569 B1 | 4/2002 | Haddon et al. |
| 6,372,376 B1 | 4/2002 | Fronk et al. |
| 6,376,057 B1 | 4/2002 | Akao et al. |
| 6,379,795 B1 | 4/2002 | Bisaria et al. |
| 6,384,128 B1 | 5/2002 | Wadahara et al. |
| 6,388,046 B1 | 5/2002 | Campbell et al. |
| 6,407,922 B1 | 6/2002 | Eckblad et al. |
| 6,426,134 B1 | 7/2002 | Lavin et al. |
| 6,517,995 B1 | 2/2003 | Jacobson et al. |
| 6,528,572 B1 * | 3/2003 | Patel et al. ................. 524/495 |
| 6,540,945 B2 | 4/2003 | Kubotera et al. |
| 6,544,463 B1 | 4/2003 | Luzzi et al. |
| 6,555,945 B1 | 4/2003 | Baughman et al. |
| 6,565,784 B1 | 5/2003 | Esseghir et al. |
| 6,576,341 B1 | 6/2003 | Davey et al. |
| 6,599,446 B1 | 7/2003 | Todt et al. |
| 6,608,133 B2 | 8/2003 | Kurasawa et al. |
| 6,630,772 B1 | 10/2003 | Bower et al. |
| 6,634,321 B2 | 10/2003 | Hussain et al. |
| 6,643,165 B2 | 11/2003 | Segal et al. |
| 6,673,864 B2 | 1/2004 | Patel et al. |
| 6,689,835 B2 | 2/2004 | Amarasekera et al. |
| 6,734,262 B2 | 5/2004 | Patel |
| 6,761,870 B1 | 7/2004 | Smalley et al. |
| 6,790,425 B1 | 9/2004 | Smalley et al. |
| 6,811,724 B2 | 11/2004 | Majumdar et al. |
| 6,936,233 B2 | 8/2005 | Smalley et al. |
| 7,026,432 B2 | 4/2006 | Charati et al. |
| 2001/0010809 A1 | 8/2001 | Haddon et al. |
| 2001/0016608 A1 | 8/2001 | Haddon et al. |
| 2001/0023937 A1 | 9/2001 | Patel |
| 2001/0031900 A1 | 10/2001 | Margrave et al. |
| 2001/0041160 A1 | 11/2001 | Margrave et al. |
| 2002/0004028 A1 | 1/2002 | Margrave et al. |
| 2002/0031465 A1 | 3/2002 | Saito |
| 2002/0035170 A1 | 3/2002 | Glatkowski et al. |
| 2002/0039675 A1 | 4/2002 | Braun et al. |
| 2002/0046872 A1 | 4/2002 | Smalley et al. |
| 2002/0048632 A1 | 4/2002 | Smalley et al. |
| 2002/0053257 A1 | 5/2002 | Brice et al. |
| 2002/0068170 A1 | 6/2002 | Smalley et al. |
| 2002/0084410 A1 | 7/2002 | Colbert et al. |
| 2002/0085968 A1 | 7/2002 | Smalley et al. |
| 2002/0086124 A1 | 7/2002 | Margrave et al. |
| 2002/0088938 A1 | 7/2002 | Colbert et al. |
| 2002/0090331 A1 | 7/2002 | Smalley et al. |
| 2002/0091619 A1 | 7/2002 | Yang |
| 2002/0092613 A1 | 7/2002 | Kuper |
| 2002/0092983 A1 | 7/2002 | Colbert et al. |
| 2002/0092984 A1 | 7/2002 | Colbert et al. |
| 2002/0094311 A1 | 7/2002 | Smalley et al. |
| 2002/0096634 A1 | 7/2002 | Colbert et al. |
| 2002/0098135 A1 | 7/2002 | Smalley et al. |
| 2002/0099128 A1 | 7/2002 | Patel et al. |
| 2002/0102193 A1 | 8/2002 | Smalley et al. |
| 2002/0102194 A1 | 8/2002 | Smalley et al. |
| 2002/0102196 A1 | 8/2002 | Smalley et al. |
| 2002/0102201 A1 | 8/2002 | Colbert et al. |
| 2002/0102203 A1 | 8/2002 | Smalley et al. |
| 2002/0109086 A1 | 8/2002 | Colbert et al. |
| 2002/0109087 A1 | 8/2002 | Colbert et al. |
| 2002/0110513 A1 | 8/2002 | Margrave et al. |
| 2002/0127162 A1 | 9/2002 | Smalley et al. |
| 2002/0127169 A1 | 9/2002 | Smalley et al. |
| 2002/0136681 A1 | 9/2002 | Smalley et al. |
| 2002/0136683 A1 | 9/2002 | Smalley et al. |
| 2002/0150524 A1 | 10/2002 | Smalley et al. |
| 2002/0155333 A1 | 10/2002 | Fitts et al. |
| 2002/0159943 A1 | 10/2002 | Smalley et al. |
| 2002/0159944 A1 | 10/2002 | Smalley et al. |
| 2002/0161101 A1 | 10/2002 | Carroll et al. |
| 2002/0172789 A1 | 11/2002 | Watson et al. |
| 2002/0176650 A1 | 11/2002 | Zhao et al. |
| 2002/0179564 A1 | 12/2002 | Geobegan et al. |
| 2002/0180077 A1 | 12/2002 | Glatkowski et al. |
| 2002/0183438 A1 | 12/2002 | Amarasekera et al. |
| 2002/0185770 A1 | 12/2002 | McKague |
| 2003/0001141 A1 | 1/2003 | Sun et al. |
| 2003/0004058 A1 | 1/2003 | Li et al. |
| 2003/0008123 A1 | 1/2003 | Glatkowski et al. |
| 2003/0010910 A1 | 1/2003 | Colbert et al. |
| 2003/0012722 A1 | 1/2003 | Liu |
| 2003/0026754 A1 | 2/2003 | Clarke et al. |
| 2003/0044608 A1 | 3/2003 | Yoshizawa et al. |
| 2003/0053801 A1 | 3/2003 | Cornell |
| 2003/0066960 A1 | 4/2003 | Colbert et al. |
| 2003/0075682 A1 | 4/2003 | Colbert et al. |
| 2003/0083421 A1 | 5/2003 | Kumar et al. |
| 2003/0089890 A1 | 5/2003 | Niu et al. |
| 2003/0089893 A1 | 5/2003 | Niu et al. |
| 2003/0092824 A1 | 5/2003 | Bastiaens et al. |
| 2003/0100653 A1 | 5/2003 | Chacko |
| 2003/0106998 A1 | 6/2003 | Colbert et al. |
| 2003/0108477 A1 | 6/2003 | Keller et al. |
| 2003/0111333 A1 | 6/2003 | Montgomery et al. |
| 2003/0122111 A1 | 7/2003 | Glatkowski et al. |
| 2003/0124717 A1 | 7/2003 | Awano et al. |
| 2003/0132376 A1 | 7/2003 | Bonnell et al. |
| 2003/0133865 A1 | 7/2003 | Smalley et al. |
| 2003/0143350 A1 | 7/2003 | Jimenez |
| 2003/0151030 A1 | 8/2003 | Gurin |
| 2003/0153965 A1 | 8/2003 | Supronowicz et al. |
| 2003/0164427 A1 | 9/2003 | Glatkowski et al. |
| 2003/0165658 A1 | 9/2003 | Hayakawa et al. |
| 2003/0168756 A1 | 9/2003 | Balkus, Jr. et al. |
| 2003/0170166 A1 | 9/2003 | Smalley et al. |
| 2003/0171457 A1 | 9/2003 | Matuana et al. |
| 2003/0180526 A1 | 9/2003 | Winey et al. |
| 2003/0181568 A1 | 9/2003 | Amarasekera et al. |
| 2003/0213939 A1 | 11/2003 | Narayan et al. |

| | | | |
|---|---|---|---|
| 2003/0216502 A1 | 11/2003 | McElrath et al. | |
| 2004/0009346 A1 | 1/2004 | Jang et al. | |
| 2004/0021133 A1 | 2/2004 | Nagpal et al. | |
| 2004/0028859 A1 | 2/2004 | LeGrande et al. | |
| 2004/0106998 A1 | 6/2004 | Ferree | |
| 2004/0186220 A1 | 9/2004 | Smalley et al. | |
| 2004/0211942 A1 | 10/2004 | Clark et al. | |
| 2004/0232389 A1 | 11/2004 | Elkovitch | |
| 2004/0238793 A1 | 12/2004 | Hossan et al. | |
| 2004/0242792 A1* | 12/2004 | Sotzing | 525/326.1 |
| 2004/0262581 A1 | 12/2004 | Rodrigues | |
| 2005/0029498 A1 | 2/2005 | Elkovitch | |

FOREIGN PATENT DOCUMENTS

| | | |
|---|---|---|
| EP | 0 822 224 A2 | 2/1998 |
| EP | 0 365 168 B1 | 5/1999 |
| EP | 1 073 090 A2 | 1/2001 |
| EP | 0 854 839 B1 | 4/2002 |
| EP | 1 209 123 A2 | 5/2002 |
| EP | 1 428 793 A1 | 12/2002 |
| EP | 1 336 673 A1 | 8/2003 |
| EP | 1 359 169 A2 | 11/2003 |
| EP | 1 369 452 A1 | 12/2003 |
| EP | 1 052 654 B1 | 1/2004 |
| EP | 1 460 703 A1 | 9/2004 |
| WO | WO 97/09272 | 3/1997 |
| WO | WO 97/15935 | 5/1997 |
| WO | WO 97/32646 | 9/1997 |
| WO | WO 98/05920 | 2/1998 |
| WO | WO 98/39250 | 9/1998 |
| WO | WO 00/17101 | 3/2000 |
| WO | WO 00/17102 | 3/2000 |
| WO | WO 00/26138 | 5/2000 |
| WO | WO 00/52710 | 9/2000 |
| WO | WO 01/17101 A1 | 3/2001 |
| WO | WO 01/30694 A1 | 5/2001 |
| WO | WO 01/38219 A1 | 5/2001 |
| WO | WO 01/49599 A2 | 7/2001 |
| WO | WO 01/57284 A1 | 8/2001 |
| WO | WO 01/75902 A1 | 10/2001 |
| WO | WO 01/89013 A2 | 11/2001 |
| WO | WO 01/92381 A1 | 12/2001 |
| WO | WO 01/95344 A1 | 12/2001 |
| WO | WO 01/99146 A2 | 12/2001 |
| WO | WO 02/16257 A2 | 2/2002 |
| WO | WO 02/20402 A1 | 3/2002 |
| WO | WO 02/39051 A2 | 5/2002 |
| WO | WO 02/42204 A2 | 5/2002 |
| WO | WO 02/44566 A1 | 6/2002 |
| WO | WO 02/055769 A1 | 7/2002 |
| WO | WO 02/060812 A2 | 8/2002 |
| WO | WO 02/060813 A2 | 8/2002 |
| WO | WO 02/064868 A1 | 8/2002 |
| WO | WO 02/064869 A1 | 8/2002 |
| WO | WO 02/068170 A1 | 9/2002 |
| WO | WO 02/076430 A1 | 10/2002 |
| WO | WO 02/076724 A1 | 10/2002 |
| WO | WO 02/076888 A1 | 10/2002 |
| WO | WO 02/076903 A2 | 10/2002 |
| WO | WO 02/079082 A2 | 10/2002 |
| WO | WO 02/080195 A1 | 10/2002 |
| WO | WO 02/081372 A2 | 10/2002 |
| WO | WO 02/088025 A1 | 11/2002 |
| WO | WO 02/090330 A1 | 11/2002 |
| WO | WO 02/095097 A1 | 11/2002 |
| WO | WO 02/100154 A2 | 12/2002 |
| WO | WO 02/100775 A2 | 12/2002 |
| WO | WO 02/100931 A1 | 12/2002 |
| WO | WO 03/004741 A1 | 1/2003 |
| WO | WO 03/005450 A2 | 1/2003 |
| WO | WO 03/007314 A1 | 1/2003 |
| WO | WO 03/011755 A1 | 2/2003 |
| WO | WO 03/012722 A1 | 2/2003 |
| WO | WO 03/013199 A2 | 2/2003 |
| WO | WO 03/020638 | 3/2003 |
| WO | WO 03/024798 A1 | 3/2003 |
| WO | WO 03/040026 A2 | 5/2003 |
| WO | WO 03/049219 A1 | 6/2003 |
| WO | WO 03/070821 A2 | 8/2003 |
| WO | WO 03/072679 A1 | 9/2003 |
| WO | WO 03/076703 A1 | 9/2003 |
| WO | WO 03/078315 A2 | 9/2003 |
| WO | WO 03/078317 | 9/2003 |
| WO | WO 03/080513 A2 | 10/2003 |
| WO | WO 03/085049 A1 | 10/2003 |
| WO | WO 03/085681 A1 | 10/2003 |
| WO | WO 03/092763 A1 | 11/2003 |
| WO | WO 2004/001107 A2 | 12/2003 |
| WO | WO 2004/059663 A1 | 7/2004 |
| WO | WO 2004/097852 A1 | 11/2004 |

OTHER PUBLICATIONS

Applied Nanotech Inc. webpage (http://www.applied-nanotech.com/cntproperties.htm).

Japanese Abstract for JP 2002273741 A Publication date Sep. 25, 2002.

Japanese Abstract for JP 2003096313 A Publication date Apr. 3, 2003.

Japanese Abstract for JP 2001011344 A Publication date Jan. 16, 2001.

Japanese Abstract for JP 2002313147 A Publication date Oct. 25, 2002.

Japanese Abstract for JP 2003146632 A Publication date May 21, 2003.

M.S.P Shaffer et al. "Dispersion And Packing Carbon Nanotubes"; Carbon vol. 36, No. 11, pp. 1603-1612; 1998; © 1998 Elsevier Science Ltd; Received Dec. 5, 1997; accepted in revised for Mar. 4, 1998.

Collins et al. "Controlling the Electronic Properties of Carbon Nanotube Bundles"; IBM Research Division, T.J. Watson Research Center, Yorktown Heights, NY 10598, USA; 1 Page; Abstract only; Jun. 6, 2002; http://www.nanotube.org/abstracts/collinsp.html.

Tesner et al. "Formation of Carbon Fibers from Acetylene" Carbon, 1970, vol. 8, pp. 435-442, Pergamon Pres. Great Britain; Received Sep. 8, 1969.

A. Dufresne et al. "Processing and Characterization of Carbon Nanotube/Poly(styrene0co-butyl acrylate) nanocomposites" Journal of Materials Science 37 (2002); pp. 3915-3923; Received Aug. 21, 2001 and accepted Apr. 11, 2002.

International Search Report PCT/US 2004/012109 International Filing Date Apr. 20, 2004.

International Search Report PCT/US 2004/025651 International Filing Date Aug. 6, 2004.

International Search Report PCT/US 2004/030864 International Filing Date Sep. 21, 2004.

International Search Report PCT/US 2004/031061 International Filing Date Sep. 22, 2004.

U.S. Appl. No. 11/057,946, filed Feb. 15, 2005, Keulen et al., Electrically Conductive Compositions and Method of Manufacture Thereof (Copy enclosed).

Japanese Abstract for JP 02-077442 Publication date Mar. 16, 1990.

Cotton and Wilkinson, *Advanced Inorganic Chemistry*, Publisher: John Wiley & Sons 6th edition, Publication date Mar. 1999, p. 76.

J.G. Smith, et al. "Carbon Nanotube/Space Durable Polymer Nanocomposite Films for Electrostatic Charge Dissipation" NASA Langley Research Center; 34th International SAMPE Technical Conference, Baltimore, Maryland, Nov. 4-7, 2002.

International Search Report PCT/US 2004/012146 International Filing Date Apr. 20, 2004.

U.S. Appl. No. 10/675,108, filed Sep. 30, 2003, Ghosh et al., Electrically Conductive Compositions, Methods of Manufacture Thereof and Articles Derived From Such Compositions (available in IFW).

U.S. Appl. No. 10/674,096, filed Sep. 29, 2003, Mark Elkovitch, Conductive Thermoplastic Compositions, Methods of Manufacture and Articles Derived From Such Compositions (Available in IFW).

U.S. Appl. No. 10/608,976, filed Jun. 27, 2003, Rodrigues, Electrically Conductive Compositions and Method of Manufacture Thereof (available in IFW).

U.S. Appl. No. 09/787,473; filed Mar. 16, 2001 Jonh Margrave Chemical Derivatization of Single-Wall Carbon Nanotubes to Facilitate Solvation Thereof, and Use of Derivatized Nanotubes (available in IFW).

Japanese Patent Office and Derwent Abstract for JP 2002365427 A2 Publication date Dec. 18, 2002.

Harry J. Barraza et al. "SWNT-Filled Thermoplastic and Elastomeric Composites Prepared by Miniemulsion Polymerization" NANO Letters, Aug. 2002, vol. 2, No. 8, pp. 797-802.

Cheol Park et al. "Dispersion of single wall carbon nanotubes by in situ polymerization under sonication" Chemical Physics Letters 364 (2002) pp. 303-308, Oct. 4, 2002.

A. Dufresne et al. "Processing and characterization of carbon nanotube/poly(styrene-co-butyl acrylate) nanocomposites" Journal Of Materials Science 37 (2002) pp. 3915-3923.

U.S. Appl. No. 11/057,946; filed Feb. 15, 2005, Jan Peter Keulen et al., Electrically Conductive Compositions and Method of Manufacture Thereof (Available in IFW).

International Search Report PCT/US2004/020082 International Filing Date Jun. 22, 2004.

International Search Report PCT/US 2004/026136 International Filing Date Aug. 12, 2004.

JG Smith Jr., KA Watson, CM Thompson and JW Connell, Carbon Nanotube/Space Durable Plymer Nanocomposite Films For Electrostatic Charge Dissipation.

* cited by examiner

ELECTRICALLY CONDUCTIVE COMPOSITIONS AND METHOD OF MANUFACTURE THEREOF

CROSS-REFERENCE TO RELATED APPLICATION

This application is a continuation-in part of U.S. application Ser. No. 10/803,694 filed 18 Mar. 2004 now U.S. Pat. No. 7,026,432 and claims benefit to U.S. Provisional Patent Application Ser. No. 60/494,678 filed Aug. 12, 2003, which is fully incorporated herein by reference.

BACKGROUND OF THE INVENTION

This disclosure relates to electrically conductive compositions and methods of manufacture thereof.

Articles made from organic polymers are commonly utilized in material-handling and electronic devices such as packaging film, chip carriers, computers, printers and photocopier components where electrostatic dissipation or electromagnetic shielding are important requirements. Electrostatic dissipation (hereinafter ESD) is defined as the transfer of electrostatic charge between bodies at different potentials by direct contact or by an induced electrostatic field. Electromagnetic shielding (hereinafter EM shielding) effectiveness is defined as the ratio (in decibels) of the proportion of an electromagnetic field incident upon the shield that is transmitted through it. As electronic devices become smaller and faster, their sensitivity to electrostatic charges is increased and hence it is generally desirable to utilize organic polymers that have been modified to provide improved electrostatically dissipative properties. In a similar manner, it is desirable to modify organic polymers so that they can provide improved electromagnetic shielding while simultaneously retaining some or all of the advantageous mechanical properties of the organic polymers.

Conductive fillers such as graphite fibers derived from pitch and polyacrylonitrile having diameters larger than 2 micrometers are often incorporated into organic polymers to improve the electrical properties and achieve ESD and EM shielding. However, because of the large size of these graphite fibers, the incorporation of such fibers generally causes a decrease in the mechanical properties such as impact. There accordingly remains a need in the art for conductive polymeric compositions, which while providing adequate ESD and EM shielding, can retain their mechanical properties.

BRIEF DESCRIPTION OF THE INVENTION

A method for manufacturing a conductive composition comprises blending a polymer precursor with a single wall carbon nanotube composition; and polymerizing the polymer precursor to form an organic polymer.

DETAILED DESCRIPTION OF THE INVENTION

Disclosed herein are compositions comprising organic polymers and a single wall carbon nanotube (SWNT) composition that are manufactured by adding the SWNTs to the polymer precursors either prior to or during the process of polymerization of the polymer precursor. Disclosed herein are compositions comprising organic polymers and a single wall carbon nanotube (SWNTs) composition that have a bulk volume resistivity less than or equal to about $10^{12}$ ohm-cm, while displaying impact properties greater than or equal to about 5 kilojoules/square meter and a Class A surface finish. In one embodiment, the composition has a surface resistivity greater than or equal to about $10^8$ ohm/square (ohm/sq) and a bulk volume resistivity less than or equal to about $10^{12}$ ohm-cm while displaying impact properties greater than or equal to about 5 kilojoules/square meter and a Class A surface finish. In another embodiment, the composition has a surface resistivity of less than or equal to about $10^8$ ohm/square (ohm/sq) and a bulk volume resistivity of greater than or equal to about $10^8$ ohm-cm, while displaying impact properties greater than or equal to about 5 kilojoules/square meter and a Class A surface finish.

In one embodiment, the composition has a bulk volume resistivity of less than or equal to about $10^{10}$ ohm-cm while displaying impact properties greater than or equal to about 5 kilojoules/square meter and a Class A surface finish. In another embodiment, the composition has a bulk volume resistivity of less than or equal to about $10^8$ ohm-cm while displaying impact properties greater than or equal to about 5 kilojoules/square meter and a Class A surface finish. In yet another embodiment, the composition has a bulk volume resistivity of less than or equal to about $10^5$ ohm-cm while displaying impact properties greater than or equal to about 5 kilojoules/square meter and a Class A surface finish.

Such compositions can be advantageously utilized in computers, electronic goods, semi-conductor components, circuit boards, or the like that need to be protected from electrostatic charges. They may also be used advantageously in automotive body panels both for interior and exterior components of automobiles that can be electrostatically painted if desired.

In one embodiment, the SWNTs are added to the polymer precursors prior to the process of polymerization. In another embodiment, the SWNTs are added during the process of polymerization of the polymer precursors. In yet another embodiment, a proportion of the SWNTs are added to the polymer precursors prior to the process of polymerization, while another proportion of the SWNTs are added to the polymer precursors during the process of polymerization. The polymer precursors, as defined herein, comprise reactive species that are monomeric, oligomeric or polymeric and which can undergo additional polymerization.

The organic polymers that may be obtained from the polymerization of the polymer precursors are thermoplastic polymers, blends of thermoplastic polymers, or blends of thermoplastic polymers with thermosetting polymers. The organic polymers may also be a blend of polymers, copolymers, terpolymers, interpenetrating network polymers or combinations comprising at least one of the foregoing organic polymers. Examples of thermoplastic polymers include polyacetals, polyacrylics, polycarbonates, polyalkyds, polystyrenes, polyesters, polyamides, polyaramides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, or the like, or combinations comprising at least one of the foregoing organic polymers.

Specific examples of blends of thermoplastic polymers include acrylonitrile-butadiene-styrene/nylon, polycarbonate/acrylonitrile-butadiene-styrene, polyphenylene ether/polystyrene, polyphenylene ether/polyamide, polycarbonate/polyester, polyphenylene ether/polyolefin, and combinations comprising at least one of the foregoing blends of thermoplastic polymers.

In one embodiment, an organic polymer that may be used in the composition is a polyarylene ether. The term poly (arylene ether) polymer includes polyphenylene ether (PPE) and poly(arylene ether) copolymers; graft copolymers; poly (arylene ether) ether ionomers; and block copolymers of alkenyl aromatic compounds with poly(arylene ether)s, vinyl aromatic compounds, and poly(arylene ether), and the like; and combinations comprising at least one of the foregoing. Poly(arylene ether) polymers per se, are polymers comprising a plurality of structural units of the formula (I):

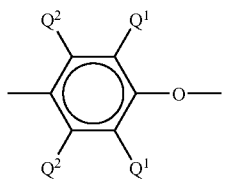

(I)

wherein for each structural unit, each $Q^1$ is independently hydrogen, halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen.

Both homopolymer and copolymer poly(arylene ether)s are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction with the hydroxy groups of two poly(arylene ether) chains to produce a higher molecular weight polymer. Poly (arylene ether)s further include combinations comprising at least one of the above.

The poly(arylene ether) has a number average molecular weight of about 10,000 to about 30,000 grams/mole (g/mole) and a weight average molecular weight of about 30,000 to about 60,000 g/mole, as determined by gel permeation chromatography. The poly(arylene ether) may have an intrinsic viscosity of about 0.10 to about 0.60 deciliters per gram (dl/g), as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

The poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether)s for many purposes are those, which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of the aminoalkyl-containing and 4-hydroxybiphenyl end groups.

In another embodiment, the organic polymer used in the composition may be a polycarbonate. Polycarbonates comprising aromatic carbonate chain units include compositions having structural units of the formula (II):

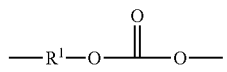

(II)

in which the $R^1$ groups are aromatic, aliphatic or alicyclic radicals. Preferably, $R^1$ is an aromatic organic radical and, more preferably, a radical of the formula (III):

(III)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. The bridging radical $Y^1$ can be a hydrocarbon group or a saturated hydrocarbon group such as methylene, cyclohexylidene or isopropylidene.

Polycarbonates may be produced by the Schotten-Baumam interfacial reaction of the carbonate precursor with dihydroxy compounds. Typically, an aqueous base such as sodium hydroxide, potassium hydroxide, calcium hydroxide, or the like, is mixed with an organic, water immiscible solvent such as benzene, toluene, carbon disulfide, or dichloromethane, which contains the dihydroxy compound. A phase transfer agent is generally used to facilitate the reaction. Molecular weight regulators may be added either singly or in admixture to the reactant mixture. Branching agents, described forthwith may also be added singly or in admixture.

Aromatic dihydroxy compound comonomers that can be employed in the disclosure comprise those of the general formula (IV):

wherein $A^2$ is selected from divalent substituted and unsubstituted aromatic radical.

In some embodiments, $A^2$ has the structure of formula (V):

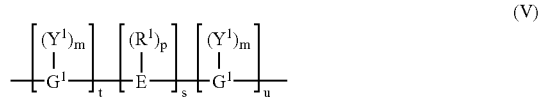

wherein $G^1$ represents an aromatic group, such as phenylene, biphenylene, naphthylene, etc. E may be an alkylene or alkylidene group such as methylene, ethylene, ethylidene, propylene, propylidene, isopropylidene, butylene, butylidene, isobutylidene, amylene, amylidene, isoamylidene, etc. and may consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage such as sulfide, sulfoxide, sulfone, etc.; or a phosphorus-containing linkage such as phosphinyl, phosphonyl, or the like. In addition, E may be a cycloaliphatic group. $R^1$ represents hydrogen or a monovalent hydrocarbon group such as alkyl, aryl, aralkyl, alkaryl, or cycloalkyl. $Y^1$ may be an inorganic atom such as halogen (fluorine, bromine, chlorine, iodine); an inorganic group such as nitro; an organic group such as alkenyl, allyl, or $R^1$ above, or an oxy group such as OR; it being only necessary that $Y^1$ be inert to and unaffected by the reactants and reaction conditions used to prepare the polymer. The letter m represents any integer from and including zero through the number of positions on $G^1$ available for substitution; p represents an integer from and including zero through the number of positions on E available for substitution; "t" represents an integer equal to at least one; "s" is either zero or one; and "u" represents any integer including zero.

Suitable examples of E include cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, etc.); a sulfur-containing linkage, such as sulfide, sulfoxide or sulfone; a phosphorus-containing linkage, such as phosphinyl, phosphonyl; an ether linkage; a carbonyl group; a tertiary nitrogen group; or a silicon-containing linkage such as silane or siloxy. In the aromatic dihydroxy comonomer compound (III) in which $A^2$ is represented by formula (IV) above, when more than one $Y^1$ substituent is present, they may be the same or different. The same holds true for the $R^1$ substituent. Where s is zero in formula (IV) and u is not zero, the aromatic rings are directly joined with no intervening alkylidene or other bridge. The positions of the hydroxyl groups and $Y^1$ on the aromatic nuclear residues $G^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments, the parameters "t", "s", and "u" are each one; both $G^1$ radicals are unsubstituted phenylene radicals; and E is an alkylidene group such as isopropylidene. In particular embodiments, both $G^1$ radicals are p-phenylene, although both may be o- or m-phenylene or one o- or m-phenylene and the other p-phenylene. Suitable examples of aromatic dihydroxy compounds of formula (IV) are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3- phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene and 1,4-bis(2-(4-hydroxy-3-methylphenyl)-2-propyl)benzene. The preferred aromatic dihydroxy compound is Bisphenol A (BPA).

Other bisphenol compounds that may be represented by formula (IV) include those where X is —O—, —S—, —SO— or —SO$_2$—. Some examples of such bisphenol compounds are bis(hydroxyaryl)ethers such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl)sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations comprising at least one of the foregoing bisphenol compounds.

Other bisphenol compounds that may be utilized in the polycondensation of polycarbonate are represented by the formula (VI)

(VI)

wherein, R$^f$, is a halogen atom of a hydrocarbon group having 1 to 10 carbon atoms or a halogen substituted hydrocarbon group; n is a value from 0 to 4. When n is at least 2, R$^f$ may be the same or different. Examples of bisphenol compounds that may be represented by the formula (V), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, or the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, or the like; or combinations comprising at least one of the foregoing bisphenol compounds.

Bisphenol compounds such as 2,2,2',2'-tetrahydro-3,3,3',3'-tetramethyl-1,1'-spirobi-[IH-indene]-6,6'-diol represented by the following formula (VI) may also be used.

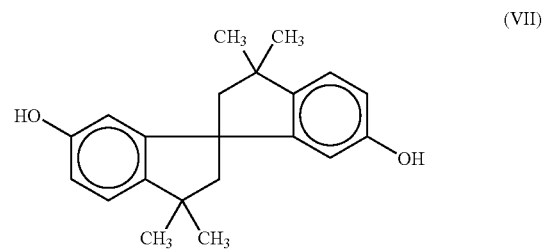

(VII)

The preferred bisphenol compound is bisphenol A.

Typical carbonate precursors include the carbonyl halides, for example carbonyl chloride (phosgene), and carbonyl bromide; the bis-haloformates, for example, the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl) carbonate, and di(naphthyl) carbonate. The preferred carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecanedioic acid.

Branched polycarbonates, as well as blends of linear polycarbonate and a branched polycarbonate may also be used in the composition. The branched polycarbonates may be prepared by adding a branching agent during polymerization. These branching agents may comprise polyfunctional organic compounds containing at least three functional groups, which may be hydroxyl, carboxyl, carboxylic anhydride, haloformyl, and combinations comprising at least one of the foregoing branching agents. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA(4(4(1,1-bis(p-hydroxyphenyl)-ethyl) α,α-dimethyl benzyl)phenol), 4-chloroformyl phthalic anhydride, trimesic acid, benzophenone tetracarboxylic acid, or the like, or combinations comprising at least one of the foregoing branching agents. The branching agents may be added at a level of about 0.05 to about 2.0 weight percent (wt %), based upon the total weight of the polycarbonate in a given layer.

In one embodiment, the polycarbonate may be produced by a melt polycondensation reaction between a dihydroxy compound and a carbonic acid diester. Examples of the carbonic acid diesters that may be utilized to produce the polycarbonates are diphenyl carbonate, bis(2,4-dichlorophenyl)carbonate, bis(2,4,6-trichlorophenyl)carbonate, bis(2-cyanophenyl)carbonate, bis(o-nitrophenyl)carbonate, ditolyl carbonate, m-cresyl carbonate, dinaphthyl carbonate, bis(diphenyl)carbonate, bis(methylsalicyl)carbonate, diethyl carbonate, dimethyl carbonate, dibutyl carbonate, dicyclohexyl carbonate, or the like, or combinations comprising at least one of the foregoing carbonic acid diesters. The preferred carbonic acid diester is diphenyl carbonate or bis(methylsalicyl)carbonate.

Preferably, the number average molecular weight of the polycarbonate is about 3,000 to about 1,000,000 grams/mole (g/mole). Within this range, it is desirable to have a number average molecular weight of greater than or equal to about 10,000, preferably greater than or equal to about 20,000, and more preferably greater than or equal to about 25,000 g/mole. Also desirable is a number average molecular weight of less than or equal to about 100,000, preferably less than or equal to about 75,000, more preferably less than or equal to about 50,000, and most preferably less than or equal to about 35,000 g/mole.

Cycloaliphatic polyesters are generally prepared by reaction of a diol with a dibasic acid or derivative. The diols useful in the preparation of the cycloaliphatic polyester polymers are straight chain, branched, or cycloaliphatic, preferably straight chain or branched alkane diols, and may contain from 2 to 12 carbon atoms.

Suitable examples of diols include ethylene glycol, propylene glycol, i.e., 1,2- and 1,3-propylene glycol; butane diol, i.e., 1,3- and 1,4-butane diol; diethylene glycol, 2,2-dimethyl-1,3-propane diol, 2-ethyl, 2-methyl, 1,3-propane diol, 1,3- and 1,5-pentane diol, dipropylene glycol, 2-methyl-1,5-pentane diol, 1,6-hexane diol, 1,4-cyclohexane dimethanol and particularly its cis- and trans-isomers, triethylene glycol, 1,10-decane diol, and mixtures of any of the foregoing. Particularly preferred is dimethanol bicyclo octane, dimethanol decalin, a cycloaliphatic diol or chemical equivalents thereof and particularly 1,4-cyclohexane dimethanol or its chemical equivalents. If 1,4-cyclohexane dimethanol is to be used as the diol component, it is generally preferred to use a mixture of cis- to trans-isomers in mole ratios of about 1:4 to about 4:1. Within this range, it is generally desired to use a mole ratio of cis- to trans-isomers of about 1:3.

The diacids useful in the preparation of the cycloaliphatic polyester polymers are aliphatic diacids that include carboxylic acids having two carboxyl groups each of which are attached to a saturated carbon in a saturated ring. Suitable examples of cycloaliphatic acids include decahydro naphthalene dicarboxylic acid, norbornene dicarboxylic acids, bicyclo octane dicarboxylic acids. Preferred cycloaliphatic diacids are 1,4-cyclohexanedicarboxylic acid and trans-1,4-cyclohexanedicarboxylic acids. Linear aliphatic diacids are also useful when the polyester has at least one monomer containing a cycloaliphatic ring. Illustrative examples of linear aliphatic diacids are succinic acid, adipic acid, dimethyl succinic acid, and azelaic acid. Mixtures of diacid and diols may also be used to make the cycloaliphatic polyesters.

Cyclohexanedicarboxylic acids and their chemical equivalents can be prepared, for example, by the hydrogenation of cycloaromatic diacids and corresponding derivatives such as isophthalic acid, terephthalic acid or naphthalenic acid in a suitable solvent, water or acetic acid at room temperature and at atmospheric pressure using suitable catalysts such as rhodium supported on a suitable carrier of carbon or alumina. They may also be prepared by the use of an inert liquid medium wherein an acid is at least partially soluble under reaction conditions and a catalyst of palladium or ruthenium in carbon or silica is used.

Typically, during hydrogenation, two or more isomers are obtained wherein the carboxylic acid groups are in either the cis- or trans-positions. The cis- and trans-isomers can be separated by crystallization with or without a solvent, for example, n-heptane, or by distillation. While the cis-isomer tends to blend better, the trans-isomer has higher melting and crystallization temperature and is generally preferred. Mixtures of the cis- and trans-isomers may also be used, and preferably when such a mixture is used, the trans-isomer will preferably comprise at least about 75 wt % and the cis-isomer will comprise the remainder based on the total weight of cis- and trans-isomers combined. When a mixture of isomers or more than one diacid is used, a copolyester or a mixture of two polyesters may be used as the cycloaliphatic polyester resin.

Chemical equivalents of these diacids including esters may also be used in the preparation of the cycloaliphatic polyesters. Suitable examples of the chemical equivalents of the diacids are alkyl esters, e.g., dialkyl esters, diaryl esters, anhydrides, acid chlorides, acid bromides, or the like, or combinations comprising at least one of the foregoing chemical equivalents. The preferred chemical equivalents comprise the dialkyl esters of the cycloaliphatic diacids, and the most preferred chemical equivalent comprises the dimethyl ester of the acid, particularly dimethyl-trans-1,4-cyclohexanedicarboxylate.

Dimethyl-1,4-cyclohexanedicarboxylate can be obtained by ring hydrogenation of dimethylterephthalate, wherein two isomers having the carboxylic acid groups in the cis- and trans-positions are obtained. The isomers can be separated, the trans-isomer being especially preferred. Mixtures of the isomers may also be used as detailed above.

The polyester polymers are generally obtained through the condensation or ester interchange polymerization of the diol or diol chemical equivalent component with the diacid or diacid chemical equivalent component and having recurring units of the formula (VIII):

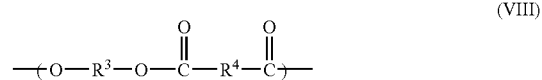

(VIII)

wherein $R^3$ represents an aryl, alkyl or cycloalkyl radical which is the residue of a straight chain, branched, or cycloaliphatic alkane diol or chemical equivalents thereof; and $R^4$ is an aryl, alkyl or a cycloaliphatic radical which is the decarboxylated residue derived from a diacid, with the proviso that at least one of $R^3$ or $R^4$ is a cycloalkyl group. The aryl radicals may be substituted aryl radicals if desired.

A preferred cycloaliphatic polyester is poly(1,4-cyclohexane-dimethanol-1,4-cyclohexanedicarboxylate) having recurring units of formula (IX)

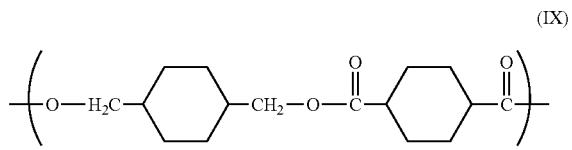

wherein in the formula (VIII), $R^3$ is a cyclohexane ring, and wherein $R^4$ is a cyclohexane ring derived from cyclohexanedicarboxylate or a chemical equivalent thereof and is selected from the cis- or trans-isomer or a mixture of cis- and trans-isomers thereof. Cycloaliphatic polyester polymers can be generally made in the presence of a suitable catalyst such as a tetra(2-ethyl hexyl)titanate, in a suitable amount, typically about 50 to 400 ppm of titanium based upon the total weight of the final product. Poly(1,4-cyclohexanedimethanol-1,4-cyclohexanedicarboxylate) generally forms a suitable blend with the polycarbonate.

Preferably, the number average molecular weight of the copolyestercarbonates or the polyesters is about 3,000 to about 1,000,000 g/mole. Within this range, it is desirable to have a number average molecular weight of greater than or equal to about 10,000, preferably greater than or equal to about 20,000, and more preferably greater than or equal to about 25,000 g/mole. Also desirable is a number average molecular weight of less than or equal to about 100,000, preferably less than or equal to about 75,000, more preferably less than or equal to about 50,000, and most preferably less than or equal to about 35,000 g/mole.

Another preferred polyester is a polyarylate. Polyarylates generally refers to polyesters of aromatic dicarboxylic acids and bisphenols. Polyarylate copolymers that include carbonate linkages in addition to the aryl ester linkages, are termed polyester-carbonates, and may also be advantageously utilized in the mixtures. The polyarylates can be prepared in solution or by the melt polymerization of aromatic dicarboxylic acids or their ester forming derivatives with bisphenols or their derivatives.

In general, it is preferred for the polyarylates to comprise at least one diphenol residue in combination with at least one aromatic dicarboxylic acid residue. The preferred diphenol residue, illustrated in formula (X), is derived from a 1,3-dihydroxybenzene moiety, referred to throughout this specification as resorcinol or resorcinol moiety. Resorcinol or resorcinol moieties include both unsubstituted 1,3-dihydroxybenzene and substituted 1,3-dihydroxybenzenes.

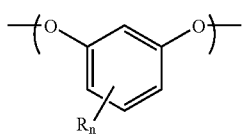

In formula (X), R is at least one of $C_{1-12}$ alkyl or halogen, and n is 0 to 3. Suitable dicarboxylic acid residues include aromatic dicarboxylic acid residues derived from monocyclic moieties, preferably isophthalic acid, terephthalic acid, or mixtures of isophthalic and terephthalic acids, or from polycyclic moieties such as diphenyl dicarboxylic acid, diphenylether dicarboxylic acid, and naphthalene-2,6-dicarboxylic acid, and the like, as well as combinations comprising at least one of the foregoing polycyclic moieties. The preferred polycyclic moiety is naphthalene-2,6-dicarboxylic acid.

Preferably, the aromatic dicarboxylic acid residues are derived from mixtures of isophthalic and/or terephthalic acids as generally illustrated in formula (XI).

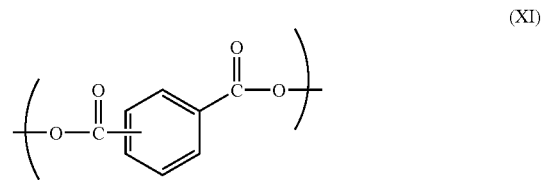

Therefore, in one embodiment the polyarylates comprise resorcinol arylate polyesters as illustrated in formula (XII)

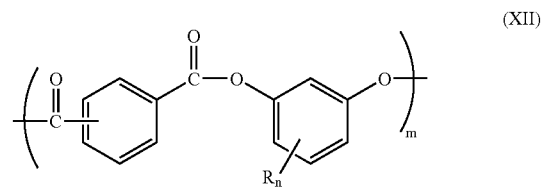

wherein R is at least one of $C_{1-12}$ alkyl or halogen, n is 0 to 3, and m is at least about 8. It is preferred for R to be hydrogen. Preferably, n is zero and m is about 10 and about 300. The molar ratio of isophthalate to terephthalate is about 0.25:1 to about 4.0:1.

In another embodiment, the polyarylate comprises thermally stable resorcinol arylate polyesters that have polycyclic aromatic radicals as shown in formula (XIII)

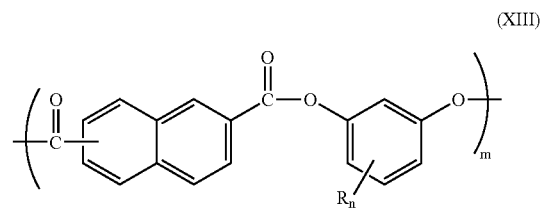

wherein R is at least one of $C_{1-12}$ alkyl or halogen, n is 0 to 3, and m is at least about 8.

In another embodiment, the polyarylates are copolymerized to form block copolyestercarbonates, which comprise carbonate and arylate blocks. They include polymers comprising structural units of the formula (XIV)

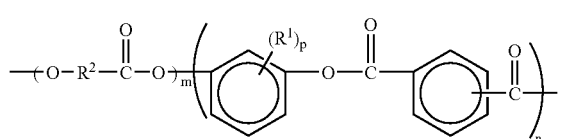

wherein each $R^1$ is independently halogen or $C_{1-12}$ alkyl, m is at least 1, p is about 0 to about 3, each $R^2$ is independently a divalent organic radical, and n is at least about 4. Preferably n is at least about 10, more preferably at least about 20 and most preferably about 30 to about 150. Preferably m is at least about 3, more preferably at least about 10 and most preferably about 20 to about 200. In an exemplary embodiment m is present in an amount of about 20 and 50.

It is generally desirable for the weight average molecular weight of the polyarylate to be about 500 to about 1,000,000 grams/mole (g/mole). In one embodiment, the polyarylate has a weight average molecular weight of about 10,000 to about 200,000 g/mole. In another embodiment, the polyarylate has a weight average molecular weight of about 30,000 to about 150,000 g/mole. In yet another embodiment, the polyarylate has a weight average molecular weight of about 50,000 to about 120,000 g/mole. An exemplary molecular weight for the polyarylate utilized in the cap layer is 60,000 and 120,000 g/mole.

In one embodiment, the polymer precursor comprises an ethylenically unsaturated group. The ethylenically unsaturated groups used can be any ethylenically unsaturated functional group capable of polymerization. Suitable ethylenically unsaturated functionality includes functionalization that can be polymerized through radical polymerization or cationic polymerization. Specific examples of suitable ethylenic unsaturation are groups containing acrylate, methacrylate, vinyl aromatic polymers such as styrene; vinylether, vinyl ester, N-substituted acrylamide, N-vinyl amide, maleate esters, fumarate esters, and the like. Preferably, the ethylenic unsaturation is provided by a group containing acrylate, methacrylate, or styrene functionality, and most preferably styrene.

The vinyl aromatic resins are preferably derived from polymer precursors that contain at least 25% by weight of structural units derived from a monomer of the formula (XV):

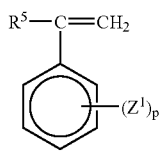

(XV)

wherein $R^5$ is hydrogen, lower alkyl or halogen; $Z^1$ is vinyl, halogen or lower alkyl; and p is from 0 to about 5. These polymers include homopolymers of styrene, chlorostyrene and vinyltoluene, random copolymers of styrene with one or more monomers illustrated by acrylonitrile, butadiene, alpha-methylstyrene, ethylvinylbenzene, divinylbenzene and maleic anhydride, and rubber-modified polystyrenes comprising blends and grafts, wherein the rubber is a polybutadiene or a rubbery copolymer of about 98-70% styrene and about 2-30% diene monomer. Polystyrenes are miscible with polyphenylene ether in all proportions, and any such blend may contain polystyrene in amounts of about 5-95% and most often about 25-75%, based on the total weight of the polymers.

In yet another embodiment, polyimides may be used as the organic polymers in the composition. Useful thermoplastic polyimides have the general formula (XVI)

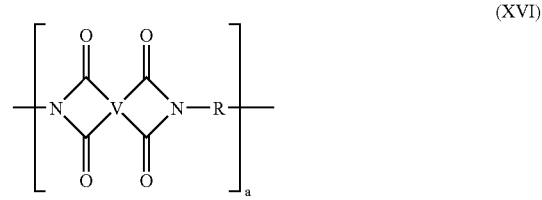

(XVI)

wherein "a" is greater than or equal to about 1, preferably greater than or equal to about 10, and more preferably greater than or equal to about 1000; and wherein V is a tetravalent linker without limitation, as long as the linker does not impede synthesis or use of the polyimide. Suitable linkers include (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations thereof. Suitable substitutions and/or linkers include, but are not limited to, ethers, epoxides, amides, esters, and combinations thereof. Preferred linkers include but are not limited to tetravalent aromatic radicals of formula (XVII), such as

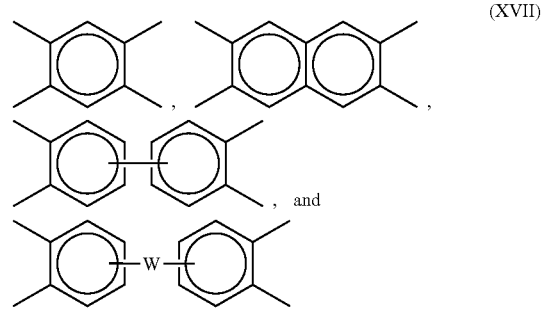

(XVII)

wherein W is a divalent moiety selected from the group consisting of —O—, —S—, —C(O)—, —SO$_2$—, —SO—, —C$_y$H$_{2y}$— (y being an integer from 1 to 5), and halogenated derivatives thereof, including perfluoroalkylene groups, or a group of the formula —O-Z-O— wherein the divalent bonds of the —O— or the —O-Z-O— group are in the 3,3',3,4', 4,3', or the 4,4' positions, and wherein Z includes, but is not limited, to divalent radicals of formula (XVIII).

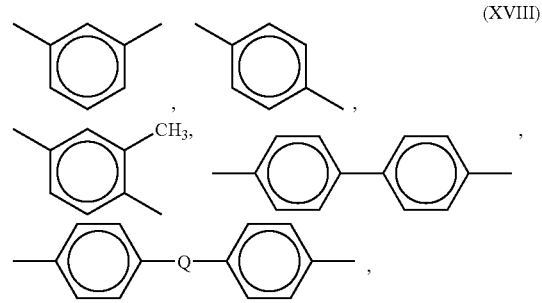

(XVIII)

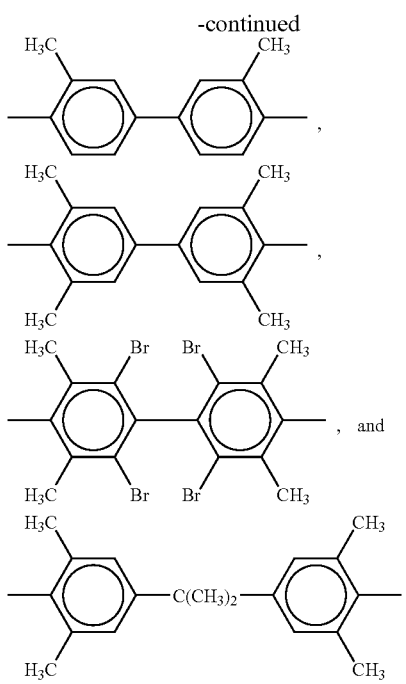

R in formula (XVI) includes substituted or unsubstituted divalent organic radicals such as (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (XIX)

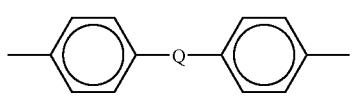

(XIX)

wherein Q includes a divalent moiety selected from the group consisting of —O—, —S—, —C(O)—, —SO$_2$—, —SO—, —C$_y$H$_{2y}$— (y being an integer from 1 to 5), and halogenated derivatives thereof, including perfluoroalkylene groups.

Preferred classes of polyimides include polyamidimides and polyetherimides, particularly those polyetherimides that are melt processable.

Preferred polyetherimide polymers comprise more than 1, typically about 10 to about 1000 or more, and more preferably about 10 to about 500 structural units, of the formula (XX)

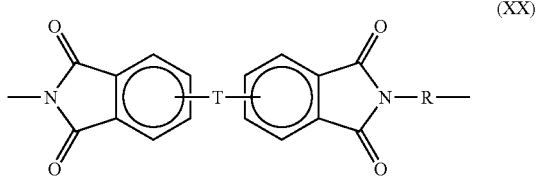

(XX)

wherein T is —O— or a group of the formula —O-Z-O— wherein the divalent bonds of the —O— or the —O-Z-O— group are in the 3,3',3,4',4,3', or the 4,4' positions, and wherein Z includes, but is not limited to, divalent radicals of formula (XVIII) as defined above.

In one embodiment, the polyetherimide may be a copolymer, which, in addition to the etherimide units described above, further contains polyimide structural units of the formula (XXI)

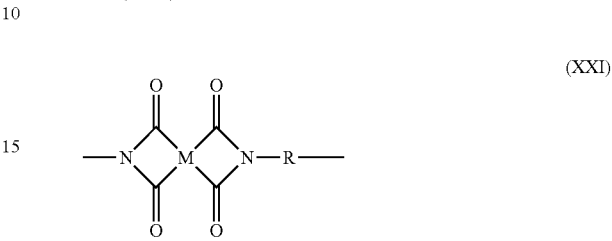

(XXI)

wherein R is as previously defined for formula (XVI) and M includes, but is not limited to, radicals of formula (XXII).

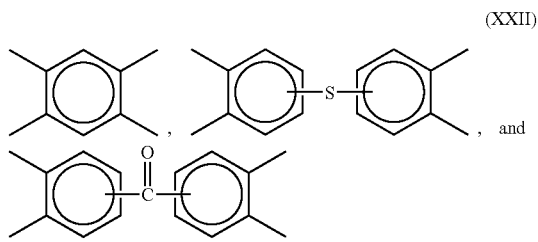

(XXII)

The polyetherimide can be prepared by any of the methods including the reaction of an aromatic bis(ether anhydride) of the formula (XXIII)

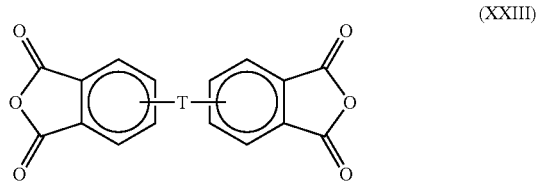

(XXIII)

with an organic diamine of the formula (XIV)

H$_2$N—R—NH$_2$ (XXIV)

wherein T and R are defined as described above in formulas (XVI) and (XX).

Illustrative examples of aromatic bis(ether anhydride)s of formula (XXIII) include 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A preferred class of aromatic bis(ether anhydride)s included by formula (XXIII) above includes, but is not limited to, compounds wherein T is of the formula (XXV)

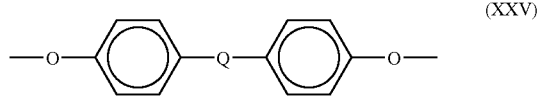

(XXV)

and the ether linkages, for example, are preferably in the 3,3',3,4',4,3', or 4,4' positions, and mixtures thereof, and where Q is as defined above.

Any diamino compound may be employed in the preparation of the polyimides and/or polyetherimides. Examples of suitable compounds are ethylenediamine, propylenediamine, trimethylenediamine, diethylenetriamine, triethylenetertramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3, 5-diethylphenyl)methane, bis(4-aminophenyl)propane, 2,4-bis(b-amino-t-butyl) toluene, bis (p-b-amino-t-butylphenyl)ether, bis(p-b-methyl-o-aminophenyl) benzene, bis(p-b-methyl-o-aminopentyl)benzene, 1,3-diamino-4-isopropylbenzene, bis(4-aminophenyl)sulfide, bis(4-aminophenyl)sulfone, bis(4-aminophenyl)ether and 1,3-bis(3-aminopropyl)tetramethyldisiloxane. Mixtures of these compounds may also be present. The preferred diamino compounds are aromatic diamines, especially m- and p-phenylenediamine and mixtures thereof.

In an exemplary embodiment, the polyetherimide resin comprises structural units according to formula (XX) wherein each R is independently p-phenylene or m-phenylene or a mixture thereof and T is a divalent radical of the formula (XXVI)

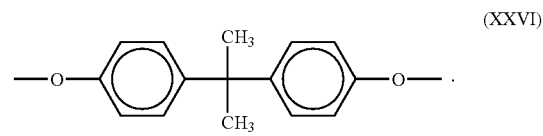

(XXVI)

In general, the reactions can be carried out employing solvents such as o-dichlorobenzene, m-cresol/toluene, or the like, to effect a reaction between the anhydride of formula (XVIII) and the diamine of formula (XIX), at temperatures of about 100° C. to about 250° C. Alternatively, the polyetherimide can be prepared by melt polymerization of aromatic bis(ether anhydride)s of formula (XVIII) and diamines of formula (XIX) by heating a mixture of the starting materials to elevated temperatures with concurrent stirring. Generally, melt polymerizations employ temperatures of about 200° C. to about 400° C. Chain stoppers and branching agents may also be employed in the reaction. When polyetherimide/polyimide copolymers are employed, a dianhydride, such as pyromellitic anhydride, is used in combination with the bis(ether anhydride). The polyetherimide polymers can optionally be prepared from reaction of an aromatic bis(ether anhydride) with an organic diamine in which the diamine is present in the reaction mixture at no more than about 0.2 molar excess, and preferably less than about 0.2 molar excess. Under such conditions the polyetherimide resin has less than about 15 microequivalents per gram ($\mu$eq/g) acid titratable groups, and preferably less than about 10 $\mu$eq/g acid titratable groups, as shown by titration with chloroform solution with a solution of 33 weight percent (wt %) hydrobromic acid in glacial acetic acid. Acid-titratable groups are essentially due to amine endgroups in the polyetherimide resin.

Generally, useful polyetherimides have a melt index of about 0.1 to about 10 grams per minute (g/min), as measured by American Society for Testing Materials (ASTM) D1238 at 295° C., using a 6.6 kilogram (kg) weight. In a preferred embodiment, the polyetherimide resin has a weight average molecular weight (Mw) of about 10,000 to about 150,000 grams per mole (g/mole), as measured by gel permeation chromatography, using a polystyrene standard. Such polyetherimide polymers typically have an intrinsic viscosity greater than about 0.2 deciliters per gram (dl/g), preferably about 0.35 to about 0.7 dl/g measured in m-cresol at 25° C.

In yet another embodiment, polyamides may be used as the organic polymers in the composition. Polyamides are generally derived from the polymerization of organic lactams having from 4 to 12 carbon atoms. Preferred lactams are represented by the formula (XXVII)

(XXVII)

wherein n is about 3 to about 11. A highly preferred lactam is epsilon-caprolactam having n equal to 5.

Polyamides may also be synthesized from amino acids having from 4 to 12 carbon atoms. Preferred amino acids are represented by the formula (XXVIII)

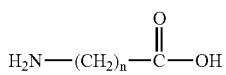

(XXVIII)

wherein n is about 3 to about 11. A highly preferred amino acid is epsilon-aminocaproic acid with n equal to 5.

Polyamides may also be polymerized from aliphatic dicarboxylic acids having from 4 to 12 carbon atoms and aliphatic diamines having from 2 to 12 carbon atoms. Suitable and preferred aliphatic dicarboxylic acids are the same as those described above for the synthesis of polyesters. Preferred aliphatic diamines are represented by the formula (XXIX)

 (XXIX)

wherein n is about 2 to about 12. A highly preferred aliphatic diamine is hexamethylenediamine ($H_2N(CH_2)_6NH_2$). It is preferred that the molar ratio of the dicarboxylic acid to the diamine be about 0.66 to about 1.5. Within this range it is generally desirable to have the molar ratio be greater than or equal to about 0.81, preferably greater than or equal to about 0.96. Also desirable within this range is an amount of less than or equal to about 1.22, preferably less than or equal to about 1.04. The preferred polyamides are nylon 6, nylon 6,6, nylon 4,6, nylon 6, 12, nylon 10, or the like, or combinations comprising at least one of the foregoing nylons.

Synthesis of polyamideesters may also be accomplished from aliphatic lactones having from 4 to 12 carbon atoms and aliphatic lactams having from 4 to 12 carbon atoms. The aliphatic lactones are the same as those described above for polyester synthesis, and the aliphatic lactams are the same as those described above for the synthesis of polyamides. The ratio of aliphatic lactone to aliphatic lactam may vary widely depending on the desired composition of the final copolymer, as well as the relative reactivity of the lactone and the lactam. A presently preferred initial molar ratio of aliphatic lactam to aliphatic lactone is about 0.5 to about 4. Within this range a molar ratio of greater than or equal to about 1 is desirable. Also desirable is a molar ratio of less than or equal to about 2.

The composition may further comprise a catalyst or an initiator. Generally, any known catalyst or initiator suitable for the corresponding thermal polymerization may be used. Alternatively, the polymerization may be conducted without a catalyst or initiator. For example, in the synthesis of polyamides from aliphatic dicarboxylic acids and aliphatic diamines, no catalyst is required.

For the synthesis of polyamides from lactams, suitable catalysts include water and the omega-amino acids corresponding to the ring-opened (hydrolyzed) lactam used in the synthesis. Other suitable catalysts include metallic aluminum alkylates ($MAl(OR)_3H$; wherein M is an alkali metal or alkaline earth metal, and R is $C_1$-$C_{12}$ alkyl), sodium dihydrobis(2-methoxyethoxy)aluminate, lithium dihydrobis(tert-butoxy)aluminate, aluminum alkylates ($Al(OR)_2R$; wherein R is $C_1$-$C_{12}$ alkyl), N-sodium caprolactam, magnesium chloride or bromide salt of epsilon-caprolactam ($MgXC_6H_{10}NO$, X=Br or Cl), dialkoxy aluminum hydride. Suitable initiators include isophthaloybiscaprolactam, N-acetalcaprolactam, isocyanate epsilon-caprolactam adducts, alcohols (ROH; wherein R is $C_1$-$C_{12}$ alkyl), diols (HO—R—OH; wherein R is R is $C_1$-$C_{12}$ alkylene), omega-aminocaproic acids, and sodium methoxide.

For the synthesis of polyamideesters from lactones and lactams, suitable catalysts include metal hydride compounds, such as a lithium aluminum hydride catalysts having the formula $LiAl(H)_x(R^1)_y$, where x is about 1 to about 4, y is about 0 to about 3, x+y is equal to 4, and $R^1$ is selected from the group consisting of $C_1$-$C_{12}$ alkyl and $C_1$-$C_{12}$ alkoxy; highly preferred catalysts include $LiAl(H)(OR^2)_3$, wherein $R^2$ is selected from the group consisting of $C_1$-$C_8$ alkyl; an especially preferred catalyst is $LiAl(H)(OC(CH_3)_3)_3$. Other suitable catalysts and initiators include those described above for the polymerization of poly(epsilon-caprolactam) and poly(epsilon-caprolactone).

A preferred type of polyamide is one obtained by the reaction of a first polyamide and a polymeric material selected from the group consisting of a second polyamide, poly(arylene ether), poly(alkenyl aromatic) homopolymer, rubber modified poly(alkenyl aromatic) resin, acrylonitrile-butadiene-styrene (ABS) graft copolymers, block copolymer, and combinations comprising two or more of the foregoing. The first polyamide comprises repeating units having formula (XXX)

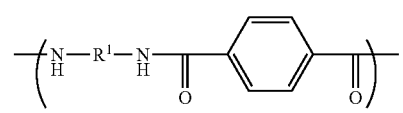

(XXX)

wherein $R^1$ is a branched or unbranched alkyl group having nine carbons. $R^1$ is preferably 1,9-nonane and/or 2-methyl-1,8-octane. Polyamide resins are characterized by the presence of an amide group (—C(O)NH—) which is the condensation product of a carboxylic acid and an amine. The first polyamide is typically made by reacting one or more diamines comprising a nine carbon alkyl moiety with terephthalic acid (1,4-dicarboxy benzene). When employing more than one diamine the ratio of the diamines can affect some of the physical properties of the resulting polymer such as the melt temperature. The ratio of diamine to dicarboxylic acid is typically equimolar although excesses of one or the other may be used to determine the end group functionality. In addition the reaction can further include monoamines and monocarboxylic acids which function as chain stoppers and determine, at least in part, the end group functionality. In some embodiments it is preferable to have an amine end group content of greater than or equal to about 30 meq/g, and more preferably greater than or equal to about 40 meq/g.

The second polyamide comprises repeating units having formula (XXXI) and/or formula (XXXII)

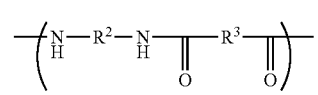

(XXXI)

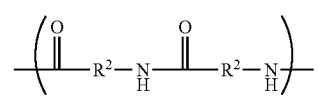

(XXXII)

wherein $R^2$ is a branched or unbranched alkyl group having four to seven carbons and $R^3$ is an aromatic group having six carbons or a branched or unbranched alkyl group having four to seven carbons. $R^2$ is preferably 1,6-hexane in formula XXXI and 1,5-pentane in formula XXXII. $R^3$ is preferably 1,4-butane.

The first polyamide has better dimensional stability, temperature resistance, resistance to moisture uptake, abrasion resistance and chemical resistance compared to other polyamides. Hence, compositions comprising the first polyamide exhibit these same improved properties when compared to comparable compositions containing other polyamides in place of the first polyamide. In some embodiments the combination of the first and second polyamide improves the compatibility of the polyamide phase with other phases, such as poly(arylene ether), in multiphasic compositions thereby improving the impact resistance. Without being bound by theory it is believed that the second polyamide increases the amount of available terminal amino groups. The terminal amino groups can, in some instances, react with components of other phases or be functionalized to react with other phases, thereby improving the compatibility.

The organic polymer is generally present in amounts of about 5 to about 99.999 weight percent (wt %) in the composition. Within this range, it is generally desirable use the organic polymer or the polymeric blend in an amount of greater than or equal to about 10 wt %, preferably greater or equal to about 30 wt %, and more preferably greater than or equal to about 50 wt % of the total weight of the composition. The organic polymers or polymeric blends are furthermore generally used in amounts less than or equal to about 99.99 wt %, preferably less than or equal to about 99.5 wt %, more preferably less than or equal to about 99.3 wt % of the total weight of the composition SWNTs used in the composition may be produced by laser-evaporation of graphite, carbon arc synthesis or the high-pressure carbon monoxide conversion process (HIPCO) process. These SWNTs generally have a single wall comprising a graphene sheet with outer diameters of about 0.7 to about 2.4 nanometers (nm). SWNTs having aspect ratios of greater than or equal to about 5, preferably greater than or equal to about 100, more preferably greater than or equal to about 1000 are generally utilized in the compositions. While the SWNTs are generally closed structures having hemispherical caps at each end of the respective tubes, it is envisioned that SWNTs having a single open end or both open ends may also be used. The SWNTs generally comprise a central portion, which is hollow, but may be filled with amorphous carbon.

In an exemplary embodiment, the purpose of dispersion of the SWNTs in an organic polymer is to disentangle the SWNTs so as to obtain an effective aspect ratio that is as close to the aspect ratio of the SWNT as possible. The ratio of the effective aspect ratio to the aspect ratio is a measure of the effectiveness of dispersion. The effective aspect ratio is a value that is twice the radius of gyration of a single SWNT divided by the outer diameter of the respective individual nanotube. It is generally desirable for the average value of ratio of the effective aspect ratio to the aspect ratio to be greater than or equal to about 0.5, preferably greater than or equal to about 0.75, and more preferably greater than or equal to about 0.90, as measured in a electron micrograph at a magnification of greater than or equal to about 10,000.

In one embodiment, the SWNTs may exist in the form of rope-like-aggregates. These aggregates are commonly termed "ropes" and are formed as a result of Van der Waal's forces between the individual SWNTs. The individual nanotubes in the ropes may slide against one another and rearrange themselves within the rope in order to minimize the free energy. Ropes generally having between 10 and $10^5$ nanotubes may be used in the compositions. Within this range, it is generally desirable to have ropes having greater than or equal to about 100, preferably greater than or equal to about 500 nanotubes. Also desirable, are ropes having less than or equal to about $10^4$ nanotubes, preferably less than or equal to about 5,000 nanotubes.

In yet another embodiment, it is desirable for the SWNT ropes to connect each other in the form of branches after dispersion. This results in a sharing of the ropes between the branches of the SWNT networks to form a 3-diminsional network in the organic polymer matrix. A distance of about 10 nm to about 10 micrometers may separate the branching points in this type of network. It is generally desirable for the SWNTs to have an inherent thermal conductivity of at least 2000 Watts per meter Kelvin (W/m-K) and for the SWNT ropes to have an inherent electrical conductivity of $10^4$ Siemens/centimeter (S/cm). It is also generally desirable for the SWNTs to have a tensile strength of at least 80 gigapascals (GPa) and a stiffness of at least about 0.5 tarapascals (TPa).

In another embodiment, the SWNTs may comprise a mixture of metallic nanotubes and semi-conducting nanotubes. Metallic nanotubes are those that display electrical characteristics similar to metals, while the semi-conducting nanotubes are those, which are electrically semi-conducting. In general the manner in which the graphene sheet is rolled up produces nanotubes of various helical structures. Zigzag and armchair nanotubes constitute two possible confirmations. In order to minimize the quantity of SWNTs utilized in the composition, it is generally desirable to have the composition comprise as large a fraction of metallic SWNTs. It is generally desirable for the SWNTs used in the composition to comprise metallic nanotubes in an amount of greater than or equal to about 1 wt %, preferably greater than or equal to about 20 wt %, more preferably greater than or equal to about 30 wt %, even more preferably greater than or equal to about 50 wt %, and most preferably greater than or equal to about 99.9 wt % of the total weight of the SWNTs. In certain situations, it is generally desirable for the SWNTs used in the composition to comprise semi-conducting nanotubes in an amount of greater than or equal to about 1 wt %, preferably greater than or equal to about 20 wt %, more preferably greater than or equal to about 30 wt %, even more preferably greater than or equal to about 50 wt %, and most preferably greater than or equal to about 99.9 wt % of the total weight of the SWNTs.

SWNTs are generally used in amounts of about 0.001 to about 80 wt % of the total weight of the composition when desirable. Within this range, SWNTs are generally used in amounts greater than or equal to about 0.25 wt %, preferably greater or equal to about 0.5 wt %, more preferably greater than or equal to about 1 wt % of the total weight of the composition. SWNTs are furthermore generally used in amounts less than or equal to about 30 wt %, preferably less than or equal to about 10 wt %, more preferably less than or equal to about 5 wt % of the total weight of the composition.

In one embodiment, the SWNTs may contain production related impurities. Production related impurities present in SWNTs as defined herein are those impurities, which are produced during processes substantially related to the production of SWNTs. As stated above, SWNTs are produced in processes such as, for example, laser ablation, chemical vapor deposition, carbon arc, high-pressure carbon monoxide conversion processes, or the like. Production related impurities are those impurities that are either formed naturally or formed deliberately during the production of SWNTs in the aforementioned processes or similar manufacturing processes. A suitable example of a production related impurity that is formed naturally are catalyst particles used in the production of the SWNTs. A suitable example of a production related impurity that is formed deliberately is a dangling bond formed on the surface of the SWNT by the deliberate addition of a small amount of an oxidizing agent during the manufacturing process.

Production related impurities include for example, carbonaceous reaction by-products such as defective SWNTs, multiwall carbon nanotubes, branched or coiled multiwall carbon nanotubes, amorphous carbon, soot, nano-onions, nanohoms, coke, or the like; catalytic residues from the catalysts utilized in the production process such as metals, metal oxides, metal carbides, metal nitrides or the like, or combinations comprising at least one of the foregoing reaction byproducts. A process that is substantially related to the production of SWNTs is one in which the fraction of SWNTs is larger when compared with any other fraction of production related impurities. In order for a process to be substantially related to the production of SWNTs, the fraction of SWNTs would have to be greater than a fraction of any one of the above listed reaction byproducts or catalytic residues. For example, the fraction of SWNTs would have to be greater than the fraction of multiwall nanotubes, or the fraction of soot, or the fraction of carbon black. The fraction of SWNTs would not have to be greater than the sums of the fractions of any combination of production related impurities for the process to be considered substantially directed to the production of SWNTs.

In general, the SWNTs used in the composition may comprise an amount of about 0.1 to about 80 wt % impurities. Within this range, the SWNTs may have an impurity content greater than or equal to about 3, preferably greater than or equal to about 7, and more preferably greater than or equal to about 8 wt %, of the total weight of the SWNTs. Also desirable within this range, is an impurity content of less than of equal to about 50, preferably less than or equal to about 45, and more preferably less than or equal to about 40 wt % of the total weight of the SWNTs.

In one embodiment, the SWNTs used in the composition may comprise an amount of about 0.1 to about 50 wt % catalytic residues. Within this range, the SWNTs may have a catalytic residue content greater than or equal to about 3, preferably greater than or equal to about 7, and more preferably greater than or equal to about 8 wt %, of the total weight of the SWNTs. Also desirable within this range, is a catalytic residue content of less than of equal to about 50, preferably less than or equal to about 45, and more preferably less than or equal to about 40 wt % of the total weight of the SWNTs.

Other carbon nanotubes such as multiwall carbon nanotubes (MWNTs) and VGCF may also be added to the compositions during the polymerization of the polymeric precursor. The MWNTs and VGCF that are added to the composition are not considered impurities since these are not produced during the production of the SWNTs. MWNTs derived from processes such as laser ablation and carbon arc synthesis, which is not directed at the production of SWNTs, may also be used in the compositions. MWNTs have at least two graphene layers bound around an inner hollow core. Hemispherical caps generally close both ends of the MWNTs, but it may desirable to use MWNTs having only one hemispherical cap or MWNTs, which are devoid of both caps. MWNTs generally have diameters of about 2 to about 50 nm. Within this range, it is generally desirable to use MWNTs having diameters less than or equal to about 40, preferably less than or equal to about 30, and more preferably less than or equal to about 20 nm. When MWNTs are used, it is preferred to have an average aspect ratio greater than or equal to about 5, preferably greater than or equal to about 100, more preferably greater than or equal to about 1000.

MWNTs are generally used in amounts of about 0.001 to about 50 wt % of the total weight of the composition when desirable. Within this range, MWNTs are generally used in amounts greater than or equal to about 0.25 wt %, preferably greater or equal to about 0.5 wt %, more preferably greater than or equal to about 1 wt % of the total weight of the composition. MWNTs are furthermore generally used in amounts less than or equal to about 30 wt %, preferably less than or equal to about 10 wt %, more preferably less than or equal to about 5 wt % of the total weight of the composition.

Other conductive fillers such as vapor grown carbon fibers, carbon black, conductive metallic fillers, solid non-metallic, conductive fillers, or the like, or combinations comprising at least one of the foregoing may optionally be used in the compositions. Vapor grown carbon fibers or small graphitic or partially graphitic carbon fibers, also referred to as vapor grown carbon fibers (VGCF), having diameters of about 3.5 to about 2000 nanometers (nm) and an aspect ratio greater than or equal to about 5 may also be used. When VGCF are used, diameters of about 3.5 to about 500 nm are preferred, with diameters of about 3.5 to about 100 nm being more preferred, and diameters of about 3.5 to about 50 nm most preferred. It is also preferable to have average aspect ratios greater than or equal to about 100 and more preferably greater than or equal to about 1000.

VGCF are generally used in amounts of about 0.001 to about 50 wt % of the total weight of the composition when desirable. Within this range, VGCF are generally used in amounts greater than or equal to about 0.25 wt %, preferably greater or equal to about 0.5 wt %, more preferably greater than or equal to about 1 wt % of the total weight of the composition. VGCF are furthermore generally used in amounts less than or equal to about 30 wt %, preferably less than or equal to about 10 wt %, more preferably less than or equal to about 5 wt % of the total weight of the composition.

Both the SWNTs and the other carbon nanotubes utilized in the composition may also be derivatized with functional groups to improve compatibility and facilitate the mixing with the organic polymer. The SWNTs and the other carbon nanotubes may be functionalized on either the graphene sheet constituting the sidewall, a hemispherical cap or on both the side wall as well as the hemispherical endcap. Functionalized SWNTs and the other carbon nanotubes are those having the formula (XXXIII)

$$[C_nH_L]R_m \qquad \text{(XXXIII)}$$

wherein n is an integer, L is a number less than 0.1 n, m is a number less than 0.5 n, and wherein each of R is the same and is selected from —SO$_3$H, —NH$_2$, —OH, —C(OH)R', —CHO, —CN, —C(O)Cl, —C(O)SH, —C(O)OR', —SR', —SiR$_3$', —Si(OR')$_y$R'$_{(3-y)}$, —R'', —AlR$_2$', AlR$_2$', halide, ethylenically unsaturated functionalities, epoxide functionalities, or the like, wherein y is an integer equal to or less than 3, R' is hydrogen, alkyl, aryl, cycloalkyl, araalkyl, cycloaryl, poly(alkylether), or the like and R'' is fluoroalkyl, fluoroaryl, fluorocycloalkyl, fluoroaralkyl, cycloaryl, or the like. The carbon atoms, C$_n$, are surface carbons of a carbon nanotube. In both, uniformly and non-uniformly substituted SWNTs and other carbon nanotubes, the surface atoms C$_n$ are reacted.

Non-uniformly substituted SWNTs and other carbon nanotubes may also be used in the composition. These include compositions of the formula (I) shown above wherein n, L, m, R and the SWNT itself are as defined above, provided that each of R does not contain oxygen, or, if each of R is an oxygen-containing group, COOH is not present.

Also included are functionalized SWNTs and other carbon nanotubes having the formula (XXXV)

$[C_nH_L][R''—R]_m$         (XXXIV)

where n, L, m, R' and R have the same meaning as above. Most carbon atoms in the surface layer of a carbon nanotube are basal plane carbons. Basal plane carbons are relatively inert to chemical attack. At defect sites, where, for example, the graphitic plane fails to extend fully around the carbon nanotube, there are carbon atoms analogous to the edge carbon atoms of a graphite plane. The edge carbons are reactive and can contain some heteroatom or group to satisfy carbon valency.

The substituted SWNTs and other carbon nanotubes described above may advantageously be further functionalized. Such compositions include compositions of the formula (XXXV)

$[C_nH_L]A_m$         (XXXV)

where n, L and m are as described above, A is selected from —OY, —NHY, —CR'$_2$—OY, —C(O)OY, —C(O)NR'Y, —C(O)SY, or —C(O)Y, wherein Y is an appropriate functional group of a protein, a peptide, an enzyme, an antibody, a nucleotide, an oligonucleotide, an antigen, or an enzyme substrate, enzyme inhibitor or the transition state analog of an enzyme substrate or is selected from —R'OH, —R'NH$_2$, —R'SH, —R'CHO, —R'CN, —R'X, —R'SiR'$_3$, —RSi—(OR')$_y$,—R'$_{(3-y)}$, —R'Si—(O—SiR'$_2$)—OR', —R'—R'', —R'—NCO, (C$_2$H$_4$O)$_w$Y, —(C$_3$H$_6$O)$_w$H, —(C$_2$H$_4$O)$_w$R', —(C$_3$H$_6$O)$_w$R' and R'', wherein w is an integer greater than one and less than 200.

The functional SWNTs and other carbon nanotubes of structure (XXXIV) may also be functionalized to produce compositions having the formula (XXXVI)

$[C_nH_L][R'-A]_m$         (XXXVI)

where n, L, m, R' and A are as defined above.

The compositions also include SWNTs and other carbon nanotubes upon which certain cyclic compounds are adsorbed. These include compositions of matter of the formula (XXXVII)

$[C_nH_L][X—R_a]_m$         (XXXVII)

where n is an integer, L is a number less than 0.1 n, m is less than 0.5n, a is zero or a number less than 10, X is a polynuclear aromatic, polyheteronuclear aromatic or metallopolyheteronuclear aromatic moiety and R is as recited above. Preferred cyclic compounds are planar macrocycles such as re porphyrins and phthalocyanines.

The adsorbed cyclic compounds may be functionalized. Such compositions include compounds of the formula (XXXVIII)

$[C_nH_L][X-A_a]_m$         (XXXVIII)

where m, n, L, a, X and A are as defined above and the carbons are on the SWNT or on other nanotubes such as MWNTs, VGCF, or the like.

Without being bound to a particular theory, the functionalized SWNTs and other carbon nanotubes are better dispersed into organic polymers because the modified surface properties may render the carbon nanotube more compatible with the organic polymer, or, because the modified functional groups (particularly hydroxyl or amine groups) are bonded directly to the organic polymer as terminal groups. In this way, organic polymers such as polycarbonates, polyamides, polyesters, polyetherimides, or the like, bond directly to the carbon nanotubes, thus making the carbon nanotubes easier to disperse with improved adherence to the organic polymer.

Functional groups may generally be introduced onto the outer surface of the SWNTs and the other carbon nanotubes by contacting the respective outer surfaces with a strong oxidizing agent for a period of time sufficient to oxidize the surface of the SWNTs and other carbon nanotubes and further contacting the respective outer surfaces with a reactant suitable for adding a functional group to the oxidized surface. Preferred oxidizing agents are comprised of a solution of an alkali metal chlorate in a strong acid. Preferred alkali metal chlorates are sodium chlorate or potassium chlorate. A preferred strong acid used is sulfuric acid. Periods of time sufficient for oxidation are about 0.5 hours to about 24 hours.

Carbon black may also be optionally used in the compositions. Preferred carbon blacks are those having average particle sizes less than about 200 nm, preferably less than about 100 nm, more preferably less than about 50 nm. Preferred conductive carbon blacks may also have surface areas greater than about 200 square meter per gram (m$^2$/g), preferably greater than about 400 m$^2$/g, yet more preferably greater than about 1000 m$^2$/g. Preferred conductive carbon blacks may have a pore volume (dibutyl phthalate absorption) greater than about 40 cubic centimeters per hundred grams (cm$^3$/100 g), preferably greater than about 100 cm$^3$/100 g, more preferably greater than about 150 cm$^3$/100 g. Exemplary carbon blacks include the carbon black commercially available from Columbian Chemicals under the trade name Conductex®; the acetylene black available from Chevron Chemical, under the trade names S.C.F. (Super Conductive Furnace) and E.C.F. (Electric Conductive Furnace); the carbon blacks available from Cabot Corp. under the trade names Vulcan XC72 and Black Pearls; and the carbon blacks commercially available from Akzo Co. Ltd under the trade names Ketjen Black EC 300 and EC 600. Preferred conductive carbon blacks may be used in amounts from about 2 wt % to about 25 wt % based on the total weight of the composition.

Solid conductive metallic fillers may also optionally be used in the conductive compositions. These may be electrically conductive metals or alloys that do not melt under conditions used in incorporating them into the organic polymer, and fabricating finished articles therefrom. Metals such as aluminum, copper, magnesium, chromium, tin, nickel, silver, iron, titanium, and mixtures comprising any one of the foregoing metals can be incorporated into the organic polymer as conductive fillers. Physical mixtures and true alloys such as stainless steels, bronzes, and the like, may also serve as conductive filler particles. In addition, a few intermetallic chemical compounds such as borides, carbides, and the like, of these metals, (e.g., titanium diboride) may also serve as conductive filler particles. Solid non-metallic, conductive filler particles such as tin-oxide, indium tin oxide, and the like may also optionally be added to render the organic polymer conductive. The solid metallic and non-metallic conductive fillers may exist in the form of powder, drawn wires, strands, fibers, tubes, nanotubes, flakes, laminates, platelets, ellipsoids, discs, and other commercially available geometries.

Non-conductive, non-metallic fillers that have been coated over a substantial portion of their surface with a coherent layer of solid conductive metal may also optionally be used in the conductive compositions. The non-conductive, non-metallic fillers are commonly referred to as substrates, and substrates coated with a layer of solid conductive metal may be referred to as "metal coated fillers". Typical conductive metals such as aluminum, copper, magnesium, chromium, tin, nickel, silver, iron, titanium, and mixtures comprising any one of the foregoing metals may be used to coat the substrates. Examples of substrates include those described in "Plastic Additives Handbook, $5^{th}$ Edition" Hans Zweifel, Ed, Carl Hanser Verlag Publishers, Munich, 2001. Examples of such substrates include silica powder, such as fused silica and crystalline silica, boron-nitride powder, boron-silicate powders, alumina, magnesium oxide (or magnesia), wollastonite, including surface-treated wollastonite, calcium sulfate (as its anhydride, dihydrate or trihydrate), calcium carbonate, including chalk, limestone, marble and synthetic, precipitated calcium carbonates, generally in the form of a ground particulates, talc, including fibrous, modular, needle shaped, and lamellar talc, glass spheres, both hollow and solid, kaolin, including hard, soft, calcined kaolin, and kaolin comprising various coatings to facilitate compatibility with the polymeric matrix polymer, mica, feldspar, silicate spheres, flue dust, cenospheres, fillite, aluminosilicate (armospheres), natural silica sand, quartz, quartzite, perlite, tripoli, diatomaceous earth, synthetic silica, and mixtures comprising any one of the foregoing. All of the above substrates may be coated with a layer of metallic material for use in the conductive compositions.

Regardless of the exact size, shape and composition of the solid metallic and non-metallic conductive filler particles, they may be dispersed into the organic polymer at loadings of about 0.001 to about 50 wt % of the total weight of the composition when desired. Within this range it is generally desirable to have the solid metallic and non-metallic conductive filler particles in an amount of greater than or equal to about 1 wt %, preferably greater than or equal to about 1.5 wt % and more preferably greater than or equal to about 2 wt % of the total weight of the composition. The loadings of the solid metallic and non-metallic conductive filler particles may be less than or equal to 40 wt %, preferably less than or equal to about 30 wt %, more preferably less than or equal to about 25 wt % of the total weight of the composition.

In one embodiment, in one method of manufacturing the composition, the polymeric precursor in the form of a monomer, oligomer, or polymer is added to a reaction vessel. Suitable examples of reaction vessels are kettles, thin film evaporators, single or multiple screw extruders, Buss kneaders, Henschel mixers, helicones, Ross mixers, Banbury, roll mills, molding machines such as injection molding machines, vacuum forming machines, blow molding machine, or then like, or combinations comprising at least one of the foregoing machines. The conductive composition comprising the SWNTs and optionally other carbon nanotubes and conductive fillers may then be added to the reaction vessel during the polymerization of the polymeric precursor.

In one embodiment, the SWNTs may be added to the reaction vessel prior to the polymerization of the polymer precursor. The polymerization of the polymer precursor may be conducted in a solvent or in the absence of a solvent, in the melt if desired. In another embodiment, the SWNTs may be added to the reaction vessel during the polymerization of the polymer precursor. In yet another embodiment, the SWNTs may be added to the reaction vessel prior the polymerization of the polymer precursor, while the other conductive and non-conductive fillers may be added to the reaction vessel after the polymerization of the organic precursors is substantially completed. In yet another embodiment, the reaction vessel may contain a high proportion of the SWNTs and other conductive and non-conductive fillers during the initial stages of the polymerization process in order to adjust the viscosity in the reaction to vessel to be effective to facilitate the disentangling of the SWNTs and other fillers. After agitating the reaction solution for a desired period of time, additional polymer precursors are added to the reaction vessel to continue the polymerization process.

In one embodiment, the SWNTs together with other conductive and non-conductive fillers may be added to the reaction vessel in the form of a masterbatch. In another embodiment, related to the use of masterbatches, a first masterbatch comprising the SWNTs may be added to the reaction vessel at a first time, while the second masterbatch comprising the other non-conductive fillers may be added to the reaction vessel at a second time during the process of polymerization of the polymer precursors.

As stated above, the composition may be manufactured in the melt or in a solution comprising a solvent. Melt reacting of the composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, baffles, or combinations comprising at least one of the foregoing.

In one embodiment, ultrasonic energy may be utilized to disperse the SWNTs. The polymer precursors together with the SWNTs, and other optional conductive or non-conductive fillers are first sonicated in an ultrasonicator to disperse the SWNTs. Following the sonication, the polymer precursors are polymerized. The ultrasonication may be continued during the polymerization process if desired. The ultrasonic energy may be applied to the different reaction vessels such as kettles, extruders, and the like, in which the polymerization may be carried out.

Melt reacting involving the aforementioned forces may be conducted in machines such as, but not limited to single or multiple screw extruders, Buss kneader, Henschel, helicones, Ross mixer, Banbury, roll mills, molding machines such as injection molding machines, vacuum forming machines, blow molding machine, or then like, or combinations comprising at least one of the foregoing machines. Solution reacting is generally conducted in a vessel such as a kettle.

In one embodiment, the polymer precursor in powder form, pellet form, sheet form, or the like, may be first dry blended with the SWNTs and other optional fillers if desired in a Henschel or a roll mill, prior to being fed into a reaction vessel such as an extruder or Buss kneader. While it is generally desirable for the shear forces in the reaction vessel to generally cause a dispersion of the SWNTs in the polymer precursor, it is also desired to preserve the aspect ratio of the SWNTs during the reaction. In order to do so, it may be desirable to introduce the SWNTs into the reaction vessel in the form of a masterbatch. In such a process, the masterbatch may be introduced into the reaction vessel downstream of the polymer precursor.

The masterbatch may comprise either an organic polymer or a polymer precursor with the SWNTs. When a masterbatch is used, the SWNTs may be present in the masterbatch in an amount of about 0.01 to about 50 wt %. Within this range, it is generally desirable to use SWNTs in an amount of greater than or equal to about 0.1 wt %, preferably greater or equal to about 0.2 wt %, more preferably greater than or equal to about 0.5 wt % of the total weight of the masterbatch. Also desirable are SWNTs in an amount of less than or equal to about 30 wt %, preferably less than or equal to about 10 wt %, more preferably less than or equal to about 5 wt % of the total weight of the masterbatch. In one embodiment pertaining to the use of masterbatches, while the masterbatch containing the SWNTs may not have a measurable bulk or surface resistivity either when extruded in the form of a strand or molded into the form of dogbone, the resulting composition into which the masterbatch is incorporated has a measurable bulk or surface resistivity, even though the weight fraction of the SWNTs in the composition is lower than that in the masterbatch. It is preferable for the organic polymer in such a masterbatch to be semi-crystalline. Examples of semi-crystalline organic polymers which display these characteristics and which may be used in masterbatches are polypropylene, polyamides, polyesters, or the like, or combinations comprising at least on of the foregoing semi-crystalline organic polymers.

The composition may also be used as a masterbatch if desired. When the composition is used as a masterbatch, the SWNTs may be present in the masterbatch in an amount of about 0.01 to about 50 wt %. Within this range, it is generally desirable to use SWNTs in an amount of greater than or equal to about 0.1 wt %, preferably greater or equal to about 0.2 wt %, more preferably greater than or equal to about 0.5 wt % of the total weight of the masterbatch. Also desirable are SWNTs in an amount of less than or equal to about 30 wt %, preferably less than or equal to about 10 wt %, more preferably less than or equal to about 5 wt % of the total weight of the masterbatch.

In another embodiment relating to the use of masterbatches in the manufacture of a composition comprising a blend of organic polymers, it is sometimes desirable to have the masterbatch comprising an organic polymer that is the same as the organic polymer that is derived from the polymerization of the polymer precursors. This feature permits the use of substantially smaller proportions of the SWNTs, since only the continuous phase of the organic polymer carries the SWNTs that provide the composition with the requisite volume and surface resistivity. In yet another embodiment relating to the use of masterbatches in polymeric blends, it may be desirable to have the masterbatch comprising an organic polymer that is different in chemistry from other the polymeric that are used in the composition. In this case, the organic polymer of the masterbatch will form the continuous phase in the blend. In yet another embodiment, it may be desirable to use a separate masterbatch comprising multiwall nanotubes, vapor grown carbon fibers, carbon black, conductive metallic fillers, solid non-metallic, conductive fillers, or the like, or combinations comprising at least one of the foregoing in the composition.

The composition comprising the organic polymer and the SWNTs may be subject to multiple blending and forming steps if desirable. For example, the composition may first be extruded and formed into pellets. The pellets may then be fed into a molding machine where it may be formed into other desirable shapes such as housing for computers, automotive panels that can be electrostatically painted, or the like. Alternatively, the composition emanating from a single melt blender may be formed into sheets or strands and subjected to post-extrusion processes such as annealing, uniaxial or biaxial orientation.

In one embodiment, the organic polymer precursor may be first mixed with the SWNT's in a reaction vessel such as a kettle, and subsequently polymerized in a device where a combination of shear, extension and/or elongational forces are used during the polymerization. Suitable devices for conducting the polymerization are those having a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, baffles, or combinations comprising at least one of the foregoing.

Solution blending may also be used to manufacture the composition. The solution blending may also use additional energy such as shear, compression, ultrasonic vibration, or the like, to promote homogenization of the SWNTs with the organic polymer. In one embodiment, the polymer precursors may be introduced into an ultrasonic sonicator along with the SWNTs. The mixture may be solution blended by sonication for a time period effective to disperse the SWNTs onto the organic polymer particles prior to or during synthesis of the polymer precursors. The organic polymer along with the SWNTs may then be dried, extruded and molded if desired.

A fluid such as a solvent may optionally be introduced into the sonicator with the SWNTs and the organic polymer precursor. The time period for the sonication is generally an amount effective to promote dispersion and/or encapsulation of the SWNTs by the organic polymer precursor. After the encapsulation, the organic polymer precursor is then polymerized to form an organic polymer within which is dispersed the SWNTs. This method of dispersion of the SWNTs in the organic polymer promotes the preservation of the aspect ratios of the SWNTs, which therefore permits the composition to develop electrical conductivity at lower loading of the SWNTs.

In general, it is desirable to sonicate the mixture of organic polymer, organic polymer precursor, fluid and the SWNTs a period of about 1 minute to about 24 hours. Within this range, it is desirable to sonicate the mixture for a period of greater than or equal to about 5 minutes, preferably greater than or equal to about 10 minutes and more preferably greater than or equal to about 15 minutes. Also desirable within this range is a time period of less than or equal to about 15 hours, preferably less than or equal to about 10 hours, and more preferably less than or equal to about 5 hours.

In one embodiment, after sonication, the mixture of organic polymer and/or organic polymer precursor, fluid and the SWNTs is allowed to stay unperturbed in the sonication vessel for a period of about 5 minutes to about 24 hours. By allowing the mixture to stay unperturbed for an extended period of time, the carbon nanotubes undergo reorganization to form a percolating network in the organic polymer or in the organic polymer precursor. The strength of electrical conductivity in the conducting composition can be related to the amount of time for which the mixture is left unperturbed. In an exemplary embodiment, the mixture after sonication can be left unperturbed for a period of about 15 minutes to about 12 hours. After being left unperturbed for a period of time, the mixture can be subjected to polymerization.

If the solution blending is conducted in a vessel with a stirrer, then it is desirable to stir the mixture as slowly as possible. Stirring the mixture at a low shear rate during solution blending and/or polymerization facilitates disentangling of the single wall carbon nanotubes and the formation of a percolating network in the conducting composite. In one embodiment, during the solution blending it is desirable to subject the mixture to a shear rate of less than or equal to about 100 seconds$^{-1}$. In another embodiment, during the solution blending it is desirable to subject the mixture to a shear rate of less than or equal to about 50 seconds$^{-1}$. In yet another embodiment, during the solution blending it is desirable to subject the mixture to a shear rate of less than or equal to about 20 seconds$^{-1}$. In yet another embodiment, during the solution blending it is desirable to subject the mixture to a shear rate of less than or equal to about 10 seconds$^{-1}$.

In another embodiment, annealing the conductive composition after polymerization can cause an improvement in electrical conductivity. In one embodiment, the conductive composition can be annealed at a temperature above the glass transition temperature of the polymer for a period of up to 12 hours. In another embodiment, the conductive composition can be advantageously annealed at a temperature of $T_g+/-50°$ C., where $T_g$ is the glass transition temperature of the polymer. In yet another embodiment, the conductive composition can be annealed above the melting point of the polymer. Annealing the conductive composition produces an increase in electrical conductivity of greater than or equal to about 10% over an identical composition that has not been annealed.

In one embodiment, related to the dispersion of the SWNTs having production related impurities, the SWNT compositions having a higher fraction of impurities may be dispersed using less energy than SWNT compositions having a lower fraction of impurities. Without being limited by theory, it is believed that in certain organic polymers, the impurities interact to promote a reduction in the Van der Waal's forces thereby facilitating an easier dispersion of the nanotubes within the organic polymer.

In another embodiment, related to the dispersion of SWNTs having production related impurities, the SWNT compositions having a higher fraction of impurities may require a larger amount of mixing than those compositions having a lower fraction of impurities. However, the composition having the SWNTs with the lower fraction of impurities generally lose electrical conductivity upon additional mixing, while the composition having the higher fraction of SWNT impurities generally gain in electrical conductivity as the amount of mixing is increased. These compositions may be used in applications where there is a need for a superior balance of flow, impact, and conductivity. They may also be used in applications where conductive materials are used and wherein the conductive materials possess very small levels of conductive filler such as in fuel cells, electrostatic painting applications, and the like.

The compositions described above may be used in a wide variety of commercial applications. They may be advantageously utilized as films for packaging electronic components such as computers, electronic goods, semi-conductor components, circuit boards, or the like that need to be protected from electrostatic dissipation. They may also be used internally inside computers and other electronic goods to provide electromagnetic shielding to personnel and other electronics located outside the computer as well as to protect internal computer components from other external electromagnetic interference. They may also be used advantageously in automotive body panels both for interior and exterior components of automobiles that can be electrostatically painted if desired.

The following examples, which are meant to be exemplary, not limiting, illustrate compositions and methods of manufacturing of some of the various embodiments of the electrically conductive compositions described herein.

EXAMPLES

Example 1

This example was undertaken to disperse SWNTs in polycarbonate (PC) and to create a masterbatch of SWNTs in PC. 250 milligrams (mg) of SWNTs obtained from Carbon Nanotechnologies Incorporated was first dispersed in 120 milliliter (ml) of 1,2 dichloroethane by using an ultrasonication horn for 30 minutes. The ultrasonic horn used an ultrasonic processor at 80% amplitude (600 Watts, probe diameter of 13 mm available from Sonics & Materials Incorporated). 30 gms of bis(methylsalicyl)carbonate (BMSC) and 20.3467 gms of bisphenol A (BPA) (mol of BMSC/mol of BPA=1.02) were added to dispersion and SWNT the reaction mixture was again sonicated for 30 minutes. The sonicated mass was transferred into a glass reactor, which was first passivated by soaking the reactor in a bath containing 1 molar aqueous hydrochloric acid solution for 24 hours followed by vigorous rinsing with deionized water. The solvent was dried by heating the glass reactor to 100° C. in presence of flowing nitrogen at low pressure. Appropriate amount of catalyst solution was then introduced into the reactor using a syringe. The amount of catalyst consists of $4.5\times10^{-6}$ moles of NaOH per mole of BPA and $3.0\times10^{-4}$ moles of TBPA (tetrabutyl phosphonium acetate) per mole of BPA (bisphenol A).

The atmosphere inside the reactor was then evacuated using a vacuum source and purged with nitrogen. This cycle was repeated 3 times after which the contents of the reactor were heated to melt the monomer mixture (bis(methylsalicyl)carbonate (BMSC) and bisphenol A (BPA)). When the temperature of the mixture reached about 180° C., the stirrer in the reactor was turned on and adjusted to about 60 revolutions per minute (rpm) to ensure that the entire solid mass fully melted, a process that usually took about 15 to about 20 minutes. Next, the reaction mixture was heated to about 220° C., while the pressure inside the reactor was adjusted slowly to about 100 millibar using a vacuum source. After stirring the reaction mass at this condition for about 15 minutes, the reaction temperature was raised to about 280° C. while readjusting the pressure to around 20 millibar. After being maintained at this condition for about 10 minutes, the temperature of the reaction mixture was raised to 300° C. while bringing the pressure down to about 1.5 millibar. After allowing the reaction to proceed under these conditions for about 2 to about 5 minutes, the pressure inside the reactor was brought to atmospheric pressure and the reactor was vented to relieve any excess pressure. Product isolation was accomplished by breaking the glass nipple at the bottom of the reactor and collecting the material. The glass reactor was dismantled and the rest of the polymer was taken our from the reactor tube.

To measure the molecular weight, the resulting polycarbonate was dissolved in methylene chloride followed by re-precipitation of the polymers from methanol. The molecular weight of the polymer was determined by gel permeation chromatography with respect to polystyrene standard. The weight average molecular weight was 55756 g/mole, while the number average molecular weight was 23,938 g/mole and the polydispersity index was 2.32.

Example 2

This example was undertaken to disperse SWNTs in PCCD (poly(1,4-cyclohexane-dimethanol-1,4-cyclohexanedicarboxylate)polymer and to create a masterbatch of SWNTs in PCCD. The PCCD polymer was synthesized by melt polycondensation in presence of SWNTs obtained from Carbon Nanotechnologies Incorporated. A slurry of SWNTs (0.24 gm, 1 wt %) was prepared by mixing the SWNTs with 1,4-dimethyl cyclohexane dicarboxylate (14.01 gm, 0.07 moles) (DMCD), 1,4-cyclohexane dimethanol (10.09 gm, 0.07 moles) (CHDM) and 1,2-dichloroethane (50 mL) under sonication as described in example 1. The slurry was transferred to the glass reactor tube. The reactor tube was mounted to the melt polycondensation reactor equipped with side arm, a mechanical stirrer driven by an overhead stirring motor and a side arm with a stop-cock. The side arm is used to purge nitrogen gas as well as for applying vacuum. Initially, the reactor tube was heated under nitrogen to remove the 1,2-dichloroethane and cooled to room temperature. The contents in the reactor were evacuated and purged with nitrogen three times to remove any traces of oxygen. The reactor was purged with nitrogen and brought to atmospheric pressure and the contents of the reaction mixture were heated to 200° C. with constant stirring (100 rpm). Through the side arm 400 parts per million (ppm) of titanium (IV) isopropoxide was added as a catalyst and the ester interchange reaction proceeded with the distillation of methanol which was collected through the side arm in the measuring cylinder (receiver). The temperature of the melt was increased to 250 ° C. and stirred for 1 hour under nitrogen. The polycondensation was conducted by reducing the pressure in the reactor in stepwise from 900 mm Hg to 700, 500, 300, 100, 50, 25, and 10 mm mercury (Hg). Finally, a full vacuum of 0.5 to 0.1 mbar was applied to the reactor and the polymerization was continued for 30 minutes. After completion of the polymerization, the pressure inside the reactor was brought to atmospheric pressure by purging with nitrogen and the polymer composite was removed from the reactor tube. The polymer was dissolved in dichloromethane for molecular weight determinations using the intrinsic viscosity method. The solution viscosity was determined in phenol/tetrachloroethane (a volume ratio of 2:3 at 25° C.) solution and was found to be 0.58 deciliter/gram (dL/g), which corresponds to the viscosity average molecular weight of 50,000 g/mole.

The masterbatches prepared in Examples 1 and 2 were then melt blended with polymers in a small scale laboratory mixing and molding machine to decrease the loading or the SWNT. The strands from the molding machine were fractured under liquid nitrogen and the exposed ends were painted with conductive silver paint to make the conductivity measurements. The conductivity values are shown in the Table 1 below.

TABLE 1

| Sample # | Final Composition | Resistivity (kOhm-cm) |
| --- | --- | --- |
| 1 | 1.1 wt % SWNT in PC | 3.5 |
| 2 | 0.5 wt % SWNT in PC | 49 |
| 3 | 0.3 wt % SWNT in PC | 119 |
| 4 | 0.2 wt % SWNT in PC | 18,500 |
| 5 | 1.1 wt % SWNT in PCCD | 17.5 |

TABLE 1-continued

| Sample # | Final Composition | Resistivity (kOhm-cm) |
| --- | --- | --- |
| 6 | 0.5 wt % SWNT in PCCD | 76 |
| 7 | 0.3 wt % SWNT in PCCD | 1,100 |
| 8 | 0.5 wt % SWNT in PCCD/PC (50/50 by weight) | 10.0 |
| 9 | 0.3 wt % SWNT in PCCD/PC (30/70 by weight) | 275 |

As may be seen from the above table, Samples 2-4 were manufactured from PC masterbatches of Example 1 (sample # 1), while Samples 6-9 were manufactured from the masterbatches of Example 2 (sample# 5). From the Examples it can be clearly seen that as the level of the SWNTs is increased, the resistivity is decreased. Further it can be seen that the masterbatches may be advantageously used to disperse the SWNT's in the polymer.

Example 3

This example was used to prepared a masterbatch of SWNTs in Nylon 6 during the polymerization of the polyamide. 24.8 gm of ε-caprolactam was taken in a beaker and heated to 90° C. After compound has melted, 250 milligrams (mg) of SWNTs containing about 10 wt % impurities (commercially available from Carbon Nanotechnologies Incorporated) was added to the ε-caprolactam. The mixture was ultrasonicated at the same temperture for half an hour using an ultrasonic processor at 80% amplitude (600 Watts, probe diameter of 13 mm available from Sonics & Materials Incorporated). The dispersion of SWNTs in the molten ε-caprolactam was then transferred to a reactor tube and was kept overnight to allow the SWNT ropes to gel (forming a network). 1.5 gm of aminocaproic acid was then added to the reactor and caprolactam was polymerized to nylon-6 by ring-opening polymerization, under nitrogen with slow stirring, for 9 hours at 260° C.

Example 4

This experiment was undertaken to prepare an SWNT composite in PCCD by in-situ polymerization without using a solvent. In this example, 17.29 gm of 1,4-cyclohexane dicarboxylate, 24.03 gms of 1,4-cyclohexane dimethanol was mixed and melted at 80° C. in a beaker. 33 mg of SWNT containing about 10 wt % impurities (commercially available from Carbon Nanotechnologies Incorporated) was added to the beaker. The mixture was ultrasonicated at the same temperture for half an hour using an ultrasonic processor at 80% amplitude (600 Watts, probe diameter 13 mm, Sonics & Materials Incorporated, USA). The dispersion of SWNT in the molten monomer mixture was then transferred to a reactor tube and was kept overnight to allow the SWNT ropes to gel (forming a network). The monomers were then polymerized to PCCD using the same procedure as in Example 2.

A portion of the composite prepared above was heated for one hour to 240° C. for Nylon 6 composite of Example 3 (above the melting point of Nylon 6) and 230° C. for the PCCD composite of Example 4 respectively. The composite was then cooled slowly to room temperature and the conductivity was measured as shown in Table 2. Similarly, the composite material from Examples 3 and 4 was melted mixed with additional polymer and pressed through in a small scale laboratory mixing and molding machine to form strands which were then used to make conductivity measurements as detailed in Example 2. These results are also shown in Table 4.

TABLE 4

| Sample # | Final Composition | Resistivity (kOhm-cm) (S.D.*) |
|---|---|---|
| 10 | 0.1 wt % SWNT in PCCD of Example 4 | — |
| 11 | 0.1 wt % SWNT in PCCD of Example 4 (with annealing) | 10,030 |
| 12 | 1 wt % SWNT in Nylon 6 of Example 3 | 33 (13) |
| 13 | 1 wt % SWNT in Nylon 6 of Example 3 (with annealing) | 24 (14) |
| 14 | 0.5 wt % SWNT in Nylon 6 (melt mixing; sample #12 used as masterbatch) | 14715 (3986) |
| 15 | 0.5 wt % SWNT in Nylon 6 (melt mixing using sample #13 as masterbatch) | 4075 (2390) |
| 16 | 0.5 wt % SWNT in Nylon 6 (melt mixed and annealed in the mold) | 702 |

*S.D. represents the numbers in the parenthesis, which are the standard deviations.

From the above data it may be seen that the samples that were annealed displayed superior electrical properties than those samples that were annealed. Annealing enables the SWNT ropes to rearrange in the polymer matrix and increases the rejoining/sharing of the SWNT rope-branches, creating an extensive long range networked morphology, which in turn, leads to higher conductivity of the composites.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

The invention claimed is:

1. A method for manufacturing a conductive composition comprising:
blending a polymer precursor with a single wall carbon nanotube composition, the single wall nanotube composition comprising carbon nanotubes that have a single wall; and
polymerizing the polymer precursor to form an organic polymer; and wherein the composition has an electrical bulk volume resistivity less than or equal to about $10^{12}$ ohm-cm, and a notched Izod impact strength greater than or equal to about 5 kilojoules/square meter.

2. The method of claim 1 wherein the composition has an electrical surface resistivity less than or equal to about $10^{12}$ ohm/square.

3. The method of claim 1, wherein the organic polymer is a polyacetal, a polyacrylic, a polyalkyd, a polyacrylate, a polycarbonate, a polystyrene, a polyester, a polyamide, a polyaramid, a polyamideimide, a polyarylate, a polyarylsulfone, a polyethersulfone, a polyphenylene sulfide, a polysulfone, a polyimide, a polyetherimide, a polytetrafluoroethylene, a polyetherketone, a polyether etherketone, a polyether ketone ketone, a polybenzoxazole, a polyoxadiazole, a polybenzothiazinophenothiazine, a polybenzothiazole, a polypyrazinoquinoxaline, a polypyromellitimide, a polyquinoxaline, a polybenzimidazole, a polyoxindole, a polyoxoisoindoline, a polydioxoisoindoline, a polytriazine, a polypyridazine, a polypiperazine, a polypyridine, a polypiperidine, a polytriazole, a polypyrazole, a polycarborane, a polyoxabicyclononane, a polydibenzofuran, a polyphthalide, a polyacetal, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfone, a polysulfonamide, a polyurea, a polyphosphazene, a polysilazane, or a combination comprising at least one of the foregoing thermoplastic polymers.

4. The method of claim 1, further comprising carbon nanotubes, wherein the carbon nanotubes are multiwall carbon nanotubes, vapor grown carbon fibers, or a combination comprising at least one of the foregoing types of carbon nanotubes; the multiwall carbon nanotubes and the vapor grown carbon fibers comprise carbon nanotubes that have at least two graphene layers.

5. The method of claim 1, wherein the single wall carbon nanotube composition comprises about 30 to about 99 wt % metallic carbon nanotubes.

6. The method of claim 1, wherein the single wall carbon nanotube composition comprises about 30 to about 99 wt % semi-conducting carbon nanotubes.

7. The method of claim 1, wherein at least a portion of the single wall carbon nanotube composition is derivatized with functional groups.

8. The method of claim 1, wherein the single wall carbon nanotube composition comprises at least a portion of single wall carbon nanotubes derivatized with functional groups either on a side-wall or on a hemispherical end.

9. The method of claim 1, wherein the single wall carbon nanotube composition comprises at least a portion of single wall carbon nanotubes having no hemispherical ends attached thereto or has a single hemispherical end attached thereto.

10. The method of claim 1, wherein the blending is accomplished through sonicating.

11. The method of claim 10, further comprising adding a solvent prior to sonication.

12. The method of claim 1, wherein the blending is accomplished in a solution comprising a solvent.

13. The method of claim 1, wherein the blending is accomplished in a melt.

14. The method of claim 1, wherein the composition is used as a masterbatch.

15. The method of claim 1, wherein the blending involves the use of shear force, extensional force, compressive force, ultrasonic energy, electromagnetic energy, thermal energy or combinations comprising at least one of the foregoing forces and energies and is conducted in processing equipment wherein the aforementioned forces or energies are exerted by a single screw, multiple screws, intermeshing co-rotating or counter rotating screws, non-intermeshing co-rotating or counter rotating screws, reciprocating screws, screws with pins, barrels with pins, screen packs, rolls, rams, helical rotors, baffles, ultrasonicator or combinations comprising at least one of the foregoing.

16. The method of claim 1, wherein the blending is conducted in a kettle, while the polymerization is conducted in a device having a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, baffles, or a combination comprising at least one of the foregoing.

17. An article manufactured by the method of claim 1.

18. A method for manufacturing a conductive composition comprising:
   blending a polymer precursor with a single wall carbon nanotube composition, the single wall nanotube composition comprising carbon nanotubes that have a single wall; and
   polymerizing the polymer precursor to form an organic polymer; wherein the composition has an electrical bulk volume resistivity less than or equal to about $10^{12}$ ohm-cm, and a notched Izod impact strength greater than or equal to about 5 kilojoules/square meter, and wherein the composition has a Class A surface finish.

19. The method of claim 18, wherein the single wall carbon nanotube composition comprises about 30 to about 99 wt % metallic carbon nanotubes.

20. The method of claim 18, wherein the single wall carbon nanotube composition comprises about 50 to about 99 wt % metallic carbon nanotubes.

21. The method of claim 18, wherein the single wall carbon nanotube composition comprises about 30 to about 99 wt % semi-conducting carbon nanotubes.

22. The method of claim 18, wherein the single wall carbon nanotube composition comprises about 50 to about 99 wt % semi-conducting carbon nanotubes.

23. The method of claim 18, wherein the blending is conducted at a shear rate of less than or equal to about 100 $seconds_{-1}$.

24. The method of claim 18, wherein the blending is conducted at a shear rate of less than or equal to about 10 $seconds_{-1}$.

25. The method of claim 18, further comprising leaving the conductive composition in an unperturbed state for up to 24 hours after blending.

26. The method of claim 18, further comprising leaving the conductive composition in an unperturbed state for up to 24 hours after polymerizing the polymer precursor.

27. The method of claim 18, further comprising annealing the conductive composition after polymerizing the polymer precursor.

28. The method of claim 18, further comprising annealing the conductive composition at a temperature above the glass transition temperature of the organic polymer.

29. An article manufactured by the method of claim 18.

* * * * *